US012677233B2

(12) United States Patent
Woo et al.

(10) Patent No.: US 12,677,233 B2
(45) Date of Patent: Jul. 7, 2026

(54) DEVICE AND METHOD FOR TRANSMITTING SIGNAL IN WIRELESS COMMUNICATION SYSTEM

(71) Applicant: SAMSUNG ELECTRONICS CO., LTD., Suwon-si (KR)

(72) Inventors: Youngyoon Woo, Suwon-si (KR); Yunsik Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 316 days.

(21) Appl. No.: 18/583,338

(22) Filed: Feb. 21, 2024

(65) Prior Publication Data

US 2024/0196352 A1 Jun. 13, 2024

Related U.S. Application Data

(63) Continuation of application No. PCT/KR2022/015233, filed on Oct. 11, 2022.

(30) Foreign Application Priority Data

Oct. 12, 2021 (KR) ......................... 10-2021-0135319

(51) Int. Cl.
*H04W 56/00* (2009.01)

(52) U.S. Cl.
CPC ................................ *H04W 56/0045* (2013.01)

(58) Field of Classification Search
CPC ......... H04W 72/0446; H04W 56/0045; H04W 88/02; H04W 88/08; H04L 5/1469; H04L 27/2607; H04B 7/2643
See application file for complete search history.

(56) References Cited

U.S. PATENT DOCUMENTS 9,848,411 B2 * 12/2017 Kim ..................... H04B 7/2656
10,477,494 B2 11/2019 Jung et al.
(Continued)

FOREIGN PATENT DOCUMENTS

CN       113347669 A     9/2021
KR   10-2012-0051706 A     5/2012
(Continued)

OTHER PUBLICATIONS

International Search Report (PCT/ISA/210) issued on Jan. 9, 2023 by the International Searching Authority in International Patent Application No. PCT/KR2022/015233.
(Continued)

*Primary Examiner* — Abdullah A Riyami
(74) *Attorney, Agent, or Firm* — Sughrue Mion, PLLC

(57) ABSTRACT

A method performed by a base station in a wireless communication system includes receiving, from a terminal configured with timing advance (TA), an uplink signal in an uplink period, according to a time division duplex (TDD) configuration, transmitting, through a transmission path of the base station to the terminal, an advance signal for a predetermined duration between an end point of receiving the uplink signal and a start point of a downlink period of the TDD configuration, the transmission path of the base station having a power amplifier as a transmission end, and transmitting, to the terminal, a downlink signal in the downlink period.

20 Claims, 11 Drawing Sheets

(56) References Cited

U.S. PATENT DOCUMENTS

| | | | |
|---|---|---|---|
| 11,985,617 | B2 * | 5/2024 | Zhang .................. H04L 5/0091 |
| 2012/0218952 | A1 | 8/2012 | Kwon et al. |
| 2014/0321337 | A1 | 10/2014 | Kim et al. |
| 2015/0003364 | A1 | 1/2015 | Kim et al. |
| 2016/0219547 | A1 | 7/2016 | Seo et al. |
| 2016/0345348 | A1 | 11/2016 | Chae et al. |
| 2018/0279334 | A1 | 9/2018 | Lim et al. |
| 2019/0260566 | A1 | 8/2019 | Fehrenbach et al. |
| 2019/0327736 | A1 | 10/2019 | Takeda et al. |
| 2020/0162231 | A1 | 5/2020 | Lee et al. |
| 2021/0258804 | A1 | 8/2021 | Amini et al. |
| 2021/0360707 | A1 | 11/2021 | Chen et al. |
| 2022/0078738 | A1 * | 3/2022 | Zhang .................. H04B 7/0696 |
| 2022/0116195 | A1 * | 4/2022 | Fehrenbach ...... H04W 72/0446 |
| 2024/0121737 | A1 * | 4/2024 | Shin ..................... H04B 7/1851 |
| 2026/0031938 | A1 * | 1/2026 | Lo ........................... H04L 5/001 |
| 2026/0032666 | A1 * | 1/2026 | Bommakanti ........ H04W 72/12 |

FOREIGN PATENT DOCUMENTS

| | | |
|---|---|---|
| KR | 10-2014-0105740 A | 9/2014 |
| KR | 10-2014-0123933 A | 10/2014 |
| KR | 10-2017-0105643 A | 9/2017 |
| KR | 10-2019-0094153 A | 8/2019 |
| KR | 10-2292994 B1 | 8/2021 |
| KR | 10-2021-0122291 A | 10/2021 |
| WO | 2014/127534 A1 | 8/2014 |
| WO | 2019/097406 A1 | 5/2019 |

OTHER PUBLICATIONS

Written Opinion (PCT/ISA/237) issued on Jan. 9, 2023 by the International Searching Authority in International Patent Application No. PCT/KR2022/015233.

Communication dated Nov. 22, 2024, issued by the European Patent Office in European Application No. 22881298.8.

Thales et al., "NR-NTN: TP for Chap 7.3 NR modifications to support NTN", 3GPP TSG RAN Meeting #80, RP-181380, Jun. 14, 2018 (34 pages total).

* cited by examiner

START

RECEIVE UL SIGNAL FROM TERMINAL
CONFIGURED WITH TA IN UL PERIOD ⟿510

TRANSMIT ADVANCE SIGNAL FOR
SPECIFIC DURATION BETWEEN RECEPTION
END POINT OF UL SIGNAL AND START POINT
OF DL PERIOD ⟿520

TRANSMIT DL SIGNAL TO TERMINAL
IN DL PERIOD ⟿530

END

DEVICE AND METHOD FOR TRANSMITTING SIGNAL IN WIRELESS COMMUNICATION SYSTEM

CROSS-REFERENCE TO RELATED APPLICATIONS

This application is a continuation application of International Application No. PCT/KR2022/015233, filed on Oct. 11, 2022, which claims priority to Korean Patent Application No. 10-2021-0135319, filed on Oct. 12, 2021, in the Korean Intellectual Property Office, the disclosures of which are incorporated by reference herein in their entireties.

BACKGROUND

1. Field

The present disclosure relates generally to a wireless communication system, and more particularly, to an apparatus and a method for transmitting a signal in the wireless communication system.

2. Description of Related Art

In order to potentially satisfy an increasing demand for wireless data traffic after commercialization of 4th generation (4G) communication systems, an advanced 5th generation (5G) communication system and/or a pre-5G communication system may be developed. Consequently, the 5G communication system and/or the pre-5G communication system may be referred to as a beyond 4G network communication system and/or a post long term evolution (LTE) system.

In order to potentially achieve a high data rate, the 5G communication system may perform wireless communication in a millimeter wave (mmWave) band (e.g., a 28 gigabyte (GB) or a 60 gigahertz (GHz) band). However, in order to potentially mitigate a propagation path loss and/or to extend a propagation distance that may be present in extremely high frequency bands (e.g., mmWave band), 5G communication systems may be considered that implement techniques and/or features such as, but not limited to, beamforming, massive multiple-input multiple-output (MIMO), full dimensional (FD)-MIMO, array antennas, analog beam-forming, large scale antennas, and the like.

Also, 5G communication systems may attempt to further enhance network performance by developing techniques such as, but not limited to, evolved small cell, advanced small cell, cloud radio access network (RAN), ultra-dense network, device to device (D2D) communication, wireless backhaul, moving network, cooperative communication, coordinated multi-points (COMP), receive interference cancellation, and the like.

In addition, the 5G communication systems may develop features and/or techniques such as, but not limited to, advanced coding modulation (ACM) schemes (e.g., hybrid frequency shift keying and quadrature amplitude modulation (FQAM), sliding window superposition coding (SWSC)) and/or advanced access technologies (e.g., filter bank multi carrier (FBMC), non-orthogonal multiple access (NOMA), and sparse code multiple access (SCMA)).

In a wireless communication system, a base station may transmit a downlink signal to a terminal. In addition, the wireless communication system may use frequency division duplexing (FDD) and/or time division duplexing (TDD) to transmit an uplink signal and/or a downlink signal between the base station and the terminal. In a TDD-based wireless communication system, the TDD may improve an error vector magnitude of the signal and/or may help to ensure communication quality. However, there is a need for an operating method for improving nonlinearity of a power amplifier caused by a heat transfer state of the power amplifier when performing communications.

SUMMARY

Provided are an apparatus and a method that may improve nonlinearity of a power amplifier by adjusting a thermal equilibrium point of the power amplifier in a wireless communication system.

Further, provided are an apparatus and a method for adjusting a thermal equilibrium point of a power amplifier by transmitting an advance signal in a wireless communication system.

Further, provided are an apparatus and a method for transmitting information transmitted from a base station to a terminal using a timing advance (TA) period in a wireless communication system.

Further, provided are an apparatus and a method for adjusting an advance signal, based on a state of a power amplifier in a wireless communication system.

Further, provided are an apparatus and a method for adjusting transmission of an advance signal based on a temperature variation of a power amplifier in a wireless communication system.

According to an aspect of the disclosure, a method performed by a base station in a wireless communication system includes receiving, from a terminal configured with timing advance (TA), an uplink signal in an uplink period, according to a time division duplex (TDD) configuration, transmitting, through a transmission path of the base station to the terminal, an advance signal for a predetermined duration between an end point of receiving the uplink signal and a start point of a downlink period of the TDD configuration, the transmission path of the base station having a power amplifier as a transmission end, and transmitting, to the terminal, a downlink signal in the downlink period.

According to an aspect of the disclosure, an apparatus of a base station in a wireless communication system includes at least one transceiver, at least one memory storing instructions, and at least one processor operatively connected to the at least one transceiver, and the at least one memory, wherein the at least one processor is configured to execute the instructions to receive, from a terminal configured with timing advance (TA), an uplink signal in an uplink period, according to a time division duplex (TDD) configuration, transmit, through a transmission path of the base station to the terminal, an advance signal for a predetermined duration between an end point of receiving the uplink signal and a start point of a downlink period of the TDD configuration, the transmission path of the base station having a power amplifier as a transmission end, and transmit, to the terminal, a downlink signal in the downlink period.

According to an aspect of the disclosure, a method of wireless communication at a base station in a wireless communication system includes receiving, from a terminal configured with timing advance (TA), an uplink signal in an uplink period, according to a time division duplex (TDD) configuration, identifying whether a power amplifier in a transmission path of the base station is in a thermal equilibrium state based on a temperature value of an element state of the power amplifier, the power amplifier being a transmission end of the transmission path, based on the power amplifier not being in the thermal equilibrium state, transmitting, through the transmission path of the base station to the terminal, an advance signal for a predetermined duration between an end point of receiving the uplink signal and a start point of a downlink period of the TDD configuration, stopping transmission of the advance signal, based on a temperature change rate of the power amplifier being smaller than a predefined threshold, and transmitting, to the terminal, a downlink signal in the downlink period.

An apparatus and a method according to embodiments of the present disclosure may improve nonlinearity of a power amplifier, by adjusting a thermal equilibrium point of the power amplifier.

An apparatus and a method according to embodiments of the present disclosure may reduce an error vector magnitude (EVM) of a power amplifier, by improving nonlinearity of the power amplifier.

An apparatus and a method according to various embodiments of the present disclosure may improve efficiency of a power amplifier, by improving nonlinearity of the power amplifier.

Effects obtainable from the present disclosure may not be limited to the above-described effects, and other effects which are not described may be clearly understood by those skilled in the art of the present disclosure through the following descriptions.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
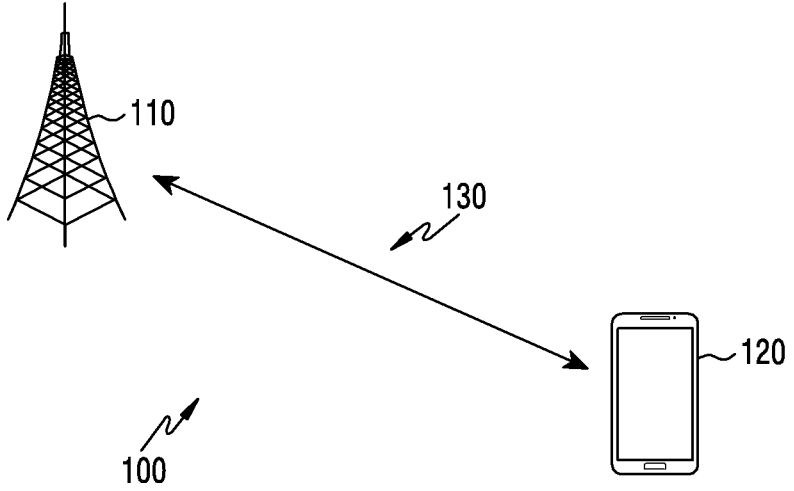
FIG. 1 illustrates an example of a wireless communication environment, according to embodiments.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

A hardware-based approach may be described as an example in various embodiments of the present disclosure. However, various embodiments of the present disclosure may include technology which may use both hardware and software, and accordingly, various embodiments of the present disclosure may not exclude a software-based approach.

Hereinafter, the present disclosure relates generally to an apparatus and a method for improving nonlinearity in a wireless communication system by reducing an error vector magnitude (EVM) in a power amplifier, and/or by adjusting a thermal equilibrium point in the wireless communication system.

In particular, the present disclosure describes techniques for adjusting the thermal equilibrium point of the power amplifier, by transmitting an advance signal, in the wireless communication system.

Terms indicating parameters related to data displaying (e.g., a target entity, a data time interval, a resource level, a data type level), terms indicating network entities, terms indicating components of a device (modified appropriately according to the disclosure), and the like used in the following description are illustrated for convenience of description. Hence, the present disclosure may not be limited to the following terms, and other terms having equivalent technical meanings may be used instead.

In addition, the present disclosure describes various embodiments using terms that may be used in some communication standards (e.g., 3rd generation partnership project (3GPP)). However, the use of these terms is made only as an example for description. That is, various embodiments of the present disclosure may be modified and/or applied in other communication systems that may use and/or implement other communication standards.

The concepts described herein may be used in various radio access systems such as, but not limited to, code division multiple access (CDMA), frequency division multiple access (FDMA), time division multiple access (TDMA), orthogonal frequency division multiple access (OFDMA), single carrier (SC)-FDMA. The CDMA system may implement a radio technology such as, but not limited to, universal terrestrial radio access (UTRA), CDMA2000, and the like. The TDMA system may a radio technology such as, but not limited to, global system for mobile communications (GSM), general packet radio service (GPRS), enhanced data rates for GSM evolution (EDGE), and the like. The OFDMA system may implement a radio technology such as, but not limited to, Institute of Electrical and Electronics Engineers (IEEE) 802.11 (Wi-Fi), IEEE 802.16 (WiMAX), IEEE 802.20 (MBWA), evolved UTRA (E-UTRA). Although the following descriptions in the present disclosure may be focused on the 3GPP New Radio (NR), the technical spirit of the present disclosure is not limited thereto. That is, the concepts described herein may be applicable to other communication technologies and the telecommunication standards that employ these technologies.

The present disclosure relates generally to a wireless communication system, and more particularly, to a downlink signal transmission method of a base station. According to various embodiments of the wireless communication system, an uplink signal and a downlink signal may be transmitted and/or received between a base station and a terminal. The uplink and/or downlink signals may be transmitted and/or received using frequency division duplexing (FDD), which may refer to transmitting the signals in different frequencies, and/or using time division duplex (TDD), which may refer to transmitting and/or receiving the signals at different times in the same frequency band.

A next-generation mobile communication system (e.g., 5th generation (5G)) may adopt a dynamic TDD communication scheme, to potentially support various user requirements such as, but not limited to, ultra-high speed, ultra-low latency, and hyper-connected services. The TDD communication scheme of a related mobile communication system (e.g., LTE) may change an uplink signal and a downlink signal based on a minimum subframe (e.g., one (1) millisecond (ms)). The number of configuration options of the uplink and the downlink may be limited in the related mobile communication system. However, the next-generation mobile communication system may change a ratio of the uplink signal and the downlink signal based on an orthogonal frequency division multiplexing (OFDM) symbol (e.g., 35.71 microseconds (μs)) which may be a smaller unit than the subframe. In addition, the next-generation mobile communication system may change the uplink and downlink configurations more flexibly and dynamically when compared to the related mobile communication system.

Hence, the next-generation mobile communication system may adaptively adjust the uplink and downlink symbol ratio according to an uplink and downlink traffic ratio per time, by employing the dynamic TDD communication scheme. In addition, the next-generation mobile communication system may flexibly provide the 5G service to various users by immediately and/or relatively quickly changing the uplink and downlink symbol configurations, according to a quality of service (QOS) requirement of the user, such as, but not limited to, ultra-high speed and ultra-low latency services.

In an embodiment, a TDD communication system may perform communication using a plurality of subframes. The TDD communication system may include a configuration that may arrange at least one downlink symbol and at least one uplink symbol on a subframe basis. Alternatively or additionally, each configuration may include a guard period (GP) between the at least one downlink symbol and the at least one uplink symbol.

A radio frequency (RF) repeater may refer to a device that may relay an RF signal between a base station and a wireless terminal. A base transceiver station (BTS) may refer to a device that may connect a network and a terminal. For example, these devices (e.g., RF repeater, BTS) may be used to expand a service area of a wireless communication system and/or to cover a shadow area of the wireless communication system. A power amplifier may be installed at a final stage of a transmitter of the above-described communication devices. However, the power amplifier may have a nonlinearity characteristic, and as such, may distort an output signal. Thus, overall performance of the transmitter may be degraded due to deterioration of the output signal. To efficiently remove the above-described nonlinearity characteristic of the power amplifier, the above communication device may employ a digital pre-distortion (DPD) device. That is, using the DPD device, the performance of the transmitter may be improved by constantly maintaining a magnitude gain and a phase gain of the power amplifier based on the magnitude of the input signal.

However, due to the TDD communication scheme, a temperature of each power amplifier element in the uplink symbol and downlink symbol periods may differ. Thus, the temperature change of the element may cause additional nonlinearity distortion. In particular, a first downlink symbol not reaching a stabilization period by thermal equilibrium may not be subject to normal linearization by the pre-distortion, thus potentially deteriorating an error vector magnitude (EVM).

To address such a problem, the present disclosure may improve the nonlinearity caused by the heat transfer state of the first symbol period of the downlink, in the power amplifier used in a related TDD communication system. Embodiments of the present disclosure may improve the EVM of the signal and ensure communication quality, when compared to related TDD communication systems.

FIG. 1 illustrates an example of a wireless communication environment, according to various embodiments. Referring to FIG. 1, a base station 110 and a terminal 120 are illustrated, as nodes of the wireless communication system 100 that may use a radio channel 130 in the wireless communication system 100. The terminal 120 may also be connected to a plurality of base stations. For example, multiple (e.g., more than one) base stations may be connected to the terminal 120 through multiple connectivity (e.g., dual connectivity (DC)).

The base station 110 may be and/or may include a network infrastructure that may provide wireless access to the terminal 120. The base station 110 may have a coverage area that may be designated as a specific geographical area based on a signal transmission distance. As used herein, the term coverage may refer to and/or may indicate a service coverage area of the base station 110. The base station 110 may cover one cell, or multiple (e.g., two or more) cells. The multiple cells may be distinguished from each other by their corresponding support frequency and/or their corresponding covered sector area.

In some embodiments, the base station 110 may be referred to as an access point (AP), an eNodeB (eNB), a 5G node, a 5G NodeB (NB), a next generation node B (gNB), a wireless point, a transmission/reception point (TRP), a distributed unit (DU), a radio unit (RU), a remote radio head (RRH), and/or other equivalent terms. According to various embodiments, the base station 110 may be connected to one or more TRPs. For example, the base station 110 may transmit a downlink signal to the terminal 120 and/or receive an uplink signal, via one or more TRPs.

The terminal 120 may be and/or may include a device used by a user, and may communicate with the base station 110 over the radio channel 130. In some cases, the terminal 120 may be operated without user involvement. That is, at least one of the terminal 120 may be and/or may include a device that may perform machine type communication (MTC), and that may not be carried (e.g., transported) by the user. In some embodiments, the terminal 120 may be referred to as a user equipment (UE), a mobile station, a subscriber station, a customer premises equipment (CPE), a remote terminal, a wireless terminal, an electronic device, a vehicle terminal, a user device, and/or other equivalent terms.

Various embodiments of the present disclosure disclose a method and an apparatus for operating based on a TDD communication system configuration. Hence, an exemplary method for transmitting uplink and downlink signals in the TDD communication system may be described.

A carrier aggregation (CA) technology may refer to a technology introduced in a telecommunication standard (e.g., 3GPP release 10). The CA technology may be intended to be used for potentially increasing frequency use efficiency of the terminal 120 and the base station 110 such that the terminal 120 may be connected to a homogeneous radio communication cell group having a common radio resource control entity, and may concurrently use a frequency resource on a component carrier of each cell located in different frequency bands for signal transmission and reception. A DC technology may refer to a technology introduced in a telecommunication standard (e.g., 3GPP release 12). The DC technology may be intended to be used for potentially increasing the frequency use efficiency of the terminal 120 and the base station 110 such that the terminal 120 may be simultaneously connected to two independent heterogeneous or homogeneous wireless communication cell groups having separate radio resource control entities, and may use a frequency resource on a component carrier of each cell group located in different frequency bands for signal transmission and reception. The DC may include a master cell group in which a control plane may be directly connected to a core network to manage a radio resource control state of the terminal 120 and a secondary cell group linked to the master cell group.

Research may be actively conducted on the DC technology and the CA technology from an academic aspect, for example, due to the possible technical advantages of increasing frequency use efficiency by using the limited wireless communication resources of the terminal 120 and the limited wireless communication resources of the base station. For example, a 5G mobile communication system may adopt, as a basic operating solution, a non-standalone 5G configuration that may operate in association with a 4th generation (4G) (e.g., LTE) core network, and that may be utilized as a core technology in a commercial service supporting the 5G mobile communication system.

The wireless communication system 100 may be and/or may include a wireless environment supporting the TDD system. The TDD communication system, which may use the same carrier frequency for uplink transmission and downlink transmission, may need to distinguish between a downlink (DL) time period and an uplink (UL) time period. Hence, the resource structures for the TDD communication system may include the DL time period and the UL time period, and a remaining period between the DL time period and the UL time period. That is, the wireless communication system 100 may temporarily divide the UL transmission and the DL transmission, according to the TDD communication scheme.

Hereafter, the resource structure for the TDD communication scheme is described. In an LTE communication system, a TDD frame may include a UL subframe for the UL transmission and a DL subframe for the DL transmission. The frame may include a special subframe (SSF) for switching from the DL transmission to the UL transmission. As used herein, a UL/DL configuration may refer to a combination of UL subframes, DL subframes, and SSFs that may be included in one frame. A different UL/DL configuration may represent a different combination of UL subframes, DL subframes, and SSFs in one frame. For example, as shown in Table 1, a UL/DL configuration #2 may include six (6) DL subframes, two (2) UL subframes, and two (2) SSFs. As another example, as further shown in Table 1, a UL/DL configuration #5 may include eight (8) DL subframes, one (1) UL subframe, and one (1) SSF. In some embodiments, the wireless communication system 100 may support an LTE-TDD communication system. In such embodiments, the UL/DL configuration may be operated as shown in Table 1 below. In the following Table 1, D may denote a DL subframe, S may denote an SSF, and U may denote a UL subframe.

TABLE 1

| UL/DL Configurations | | | | | | | | | | | | | |
|---|---|---|---|---|---|---|---|---|---|---|---|---|---|
| UL/DL | Subframe Number | | | | | | | | | | Number of Each Subframe | | |
| Configuration | 0 | 1 | 2 | 3 | 4 | 5 | 6 | 7 | 8 | 9 | DL | UL | S |
| 0 | D | S | U | U | U | D | S | U | U | U | 2 | 6 | 2 |
| 1 | D | S | U | U | D | D | S | U | U | D | 4 | 4 | 2 |
| 2 | D | S | U | D | D | D | S | U | D | D | 6 | 2 | 2 |
| 3 | D | S | U | U | U | D | D | D | D | D | 6 | 3 | 1 |
| 4 | D | S | U | U | D | D | D | D | D | D | 7 | 2 | 1 |
| 5 | D | S | U | D | D | D | D | D | D | D | 8 | 1 | 1 |
| 6 | D | S | U | U | U | D | S | U | U | D | 3 | 5 | 2 |

In order to potentially avoid interference between the UL subframes and the DL subframes between cells, adjacent cells may have the same UL/DL configuration. Thus, for ease of description, the cells of the base station 110 may be assumed to be configured with the same UL/DL configuration.

Since the same carrier frequency may be used for the UL transmission and the DL transmission in the TDD system, a base station 110, and a terminal 120 may need to switch between the DL subframes and the UL subframes. Consequently, the TDD frame may include an SSF for the switching. The SSF may include a downlink pilot time slot (DwPTS), a guard period (GP), and an uplink pilot time slot (UpPTS). The DwPTS may be and/or may include a time period configured for DL resources in the SSF and may be used to transmit a physical downlink shared channel (PDSCH). The UpPTS may be and/or may include a time period configured for UL resources within the SSF, and may be used to transmit a sounding reference signal (SRS) and/or a physical random access channel (PRACH). The GP may be and/or may include a time period in which neither the DL transmission nor the UL transmission may occur, and may be a period required for the DL/UL switching. In an embodiment, the GP may be and/or may include a time period located between the DwPTS and the UpPTS within one SSF (e.g., 1 ms). As used herein, an SSF configuration may refer to a combination of DwPTSs, GPS, and UpPTSs included in one SSF. A different SSF configuration may represent a different combination of a DwPTS length, a GP length, and an UpPTS length in one frame. For example, as shown in Table 2, a UL/DL configuration #5 may represent a combination in which the DwPTS occupies three (3) symbols, the GP occupies nine (9) symbols, and the UpPTS occupies two (2) symbols. As another example, as further shown in Table 2, a UL/DL configuration #7 may represent a combination in which the DwPTS occupies ten (10) symbols, the GP occupies two (2) symbols, and the UpPTS occupies two (2) symbols. In some embodiments, if the wireless communication environment 100 supports the LTE-TDD communication system, the SSF configuration may be operated as shown in Table 2 below.

TABLE 2

| SSF Configuration | | | | | | | | | | | | | | |
|---|---|---|---|---|---|---|---|---|---|---|---|---|---|---|
| SSF | Symbol Number | | | | | | | | | | | | | |
| Configuration | 0 | 1 | 2 | 3 | 4 | 5 | 6 | 7 | 8 | 9 | 10 | 11 | 12 | 13 |
| 0 | | Dw | | | | | | GP | | | | | | Up |
| 1 | | | | Dw | | | | | | | GP | | | Up |
| 2 | | | | Dw | | | | | | | GP | | | Up |
| 3 | | | | | Dw | | | | | | | GP | | Up |
| 4 | | | | | | Dw | | | | | | GP | Up | |
| 5 | | Dw | | | | | | GP | | | | | | Up |
| 6 | | | | Dw | | | | | | GP | | | | Up |
| 7 | | | | | Dw | | | | | | GP | | | Up |
| 8 | | | | | | Dw | | | | | GP | | | Up |
| 9 | | | Dw | | | | | | GP | | | | | Up |

In an embodiment, a DL signal transmitted from a neighboring cell may be introduced after the DwPTS period of other cell, due to propagation delay. Hence, the length of the GP may need to be allocated to block the UL transmission and the DL transmission from interfering with each other in the base station 110. That is, as the length of the GP increases, the length of the DwPTS decreases, and/or the length of the UpPTS decreases, the period in which neither the DL transmission nor the UL transmission is transmitted may increase, thus potentially avoiding the interference.

The communication node (e.g., a terminal, a base station, or an entity of a core network), according to various embodiments, may operate in an NR system. In addition, the communication node (e.g., a terminal, a base station, and an entity of a core network), according to various embodiments, may operate together in the LTE system.

In some embodiments, the base station 110 and the terminal 120 may use the TDD communication system of the NR. The TDD communication system of the NR may be configured more flexibly than the LTE TDD communication system. The TDD communication system of the NR may define a DL-UL pattern indicating a relationship between DL time resources for the DL communication and UL time resources for the UL communication. The DL-UL pattern may include a configuration periodicity, a DL time period, and a UL time period. The configuration periodicity may indicate a time for which one DL-UL pattern may be applied. For example, the configuration periodicity may be at least one of 0.5 ms, 0.625 ms, 1 ms, 1.25 ms, 2.5 ms, 3 ms, 4 ms, 5 ms, and 10 ms. The DL time period may refer to a time resource for which the DL communication continues. The DL time period may be expressed by the number of slots, the number of slots and symbols, and/or only the number of symbols. The DL time period may be located in a beginning part within one configuration period. The UL time period may refer to a time resource for which the UL continues. The UL time period may be expressed by the number of slots, the number of slots and symbols, and/or only the number of symbols. The UL time period may be located in an end part within one configuration period. Slots other than a DL slot (e.g., a slot in which all symbols are DL symbols) and a UL slot (e.g., a slot in which all symbols are UL symbols) within one configuration period may be referred to as a flexible slot.

If a subcarrier spacing (SCS) is 15 kilohertz (kHz), five (5) slots may be defined for the configuration period of 5 ms. Among the five (5) slots, the first two (2) slots may be DL slots, the last two (2) slots may be UL slots, and UL symbols and DL symbols may coexist in the middle slot. First 5 symbols of the 14 symbols of the remaining slot may be DL symbols, the last 3 symbols of the 14 symbols may be UL symbols, and the remaining 6 symbols of the 14 symbols may be flexible symbols. As such, the NR system may indicate the DL period, the UL period, and the flexible period based on the slot and the symbol.

Figure 2:
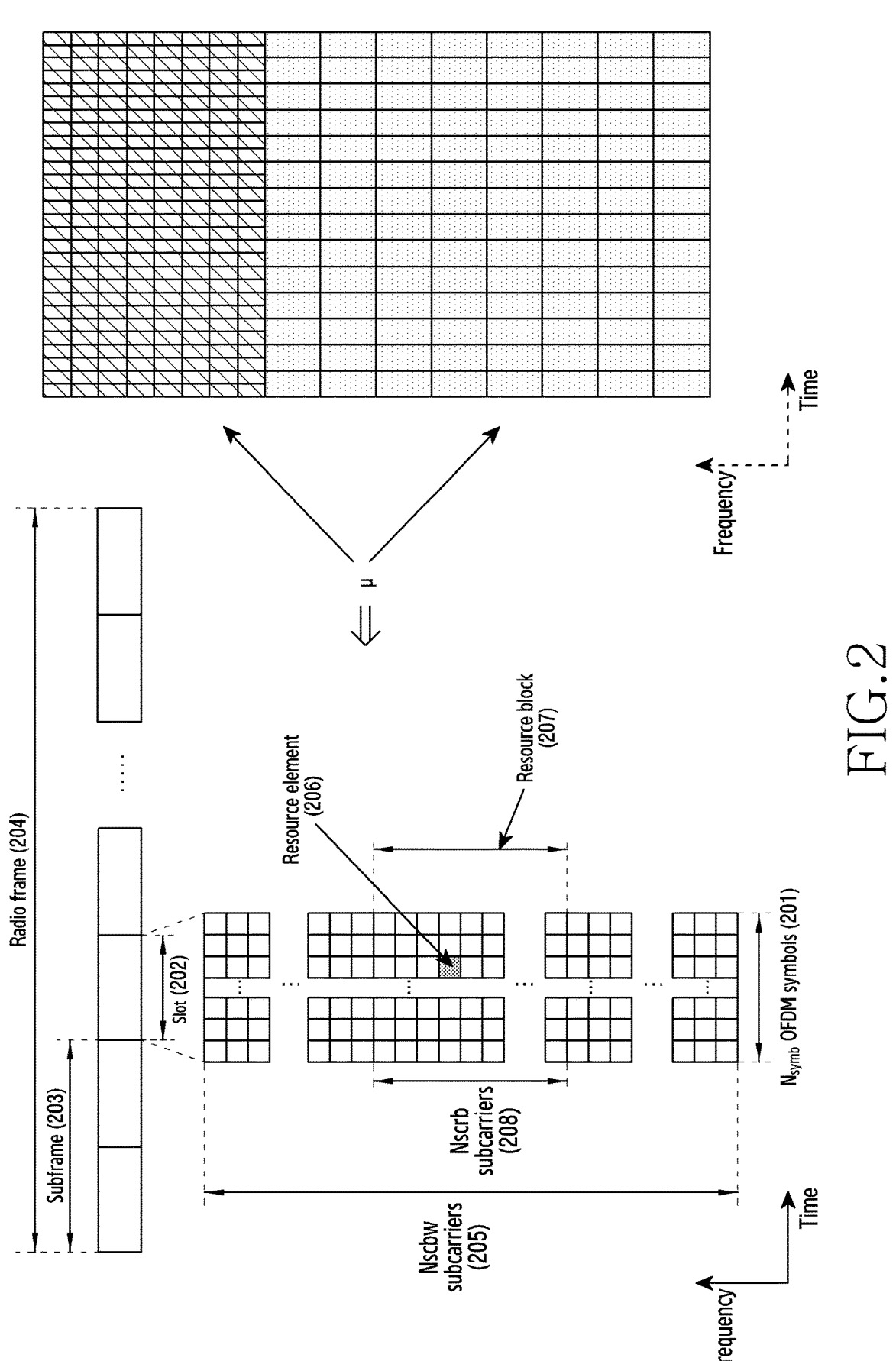
FIG. 2 illustrates an example of a radio resource domain in a wireless communication system, according to embodiments.

FIG. 2 illustrates an example of a radio resource domain in a wireless communication system, according to embodiments. In various embodiments, the radio resource domain may include a structure of a time-frequency domain. According to an embodiment, the wireless communication system may include the NR communication system.

Referring to FIG. 2, in the radio resource domain, a horizontal axis may indicate the time domain and a vertical axis may indicate the frequency domain. In an embodiment, the length of a radio frame 204 may be 10 ms. For example, the radio frame 204 may be a time domain period that may include 10 subframes. In such an example, the length of a subframe 203 may be 1 ms. A configuration unit in the time domain may be an OFDM symbol and/or a discrete Fourier transform-spread-OFDM (DFT-s-OFDM) symbol, and $N_{symb}$ OFDM and/or DFT-s-OFDM symbols 201 may construct one slot 202, where $N_{symb}$ is a positive integer greater than zero (0). For example, $N_{symb}$ may be configured to 14. In various embodiments, the OFDM symbol may include a symbol for transmitting and receiving a signal using the OFDM multiplexing, and the DFT-s-OFDM symbol may include a symbol for transmitting and receiving a signal using the DFT-s-OFDM or SC-FDMA multiplexing. A minimum transmission unit in the frequency domain may be a subcarrier, and a carrier bandwidth forming a resource grid may include $N_{SC}^{BW}$ subcarriers 205, where $N_{SC}^{BW}$ is a positive integer greater than zero (0). For example, $N_{SC}^{BW}$ may be configured to 12. While the present disclosure describes an embodiment related to DL signal transmission and reception for convenience of explanation, a similar description may also be applied to an embodiment related to UL signal transmission and reception.

In some embodiments, the number of the slots 202 forming one subframe 203 and the length of the slot 202 may vary depending on the SCS. As used herein, the SCS may be referred to as numerology μ. That is, the SCS, the number of the slots included in the subframe, the slot length, and the subframe length may be variously configured. For example, if the SCS is 15 kHz in the NR communication system, one slot 202 may form one subframe 203, and the length of the slot 202 and the subframe 203 may each be 1 ms. As another example, if the SCS is 30 kHz, two slots may form one subframe 203. In such an example, the length of the slot may be 0.5 ms and the length of the subframe may be 1 ms.

In some embodiments, the SCS, the number of the slots included in the subframe, the slot length, and the subframe length may be variously applied depending on the communication system. For example, in an LTE system, the SCS may be 15 kHz, and two slots may form one subframe, wherein the slot length may be 0.5 ms and the subframe length may be 1 ms. As another example, in an NR system, the SCS μ may be one of 15 kHz, 30 kHz, 60 kHz, 120 kHz, and 240 kHz, and the number of the slots included in one subframe may be 1, 2, 4, 8, or 16, according to the SCS μ.

A basic unit of the resource in the time-frequency domain may be a resource element (RE) 206, and the RE element 206 may be expressed with an OFDM symbol index and a subcarrier index. A resource block may include a plurality of REs. In the NR system, a resource block (RB) (or a physical resource block (PRB)) 207 may be defined as $N_{SC}^{RB}$ consecutive subcarriers 208 in the frequency domain, where $N_{SC}^{RB}$ is a positive integer greater than zero (0). For example, $N_{SC}^{RB}$ may be configured to 12. The frequency domain may include common resource blocks (CRBs). The PRB may be defined in a bandwidth part (BWP) on the frequency domain. CRB and PRB numbers may be determined differently according to the SCS. In the LTE system, the RB may be defined as $N_{symb}$ consecutive OFDM symbols in the time domain and $N_{SC}^{RB}$ consecutive subcarriers 208 in the frequency domain.

In the NR and/or LTE system, scheduling information of DL data and/or UL data may be transmitted from the base station 110 to the terminal 120 through downlink control information (DCI). In various embodiments, the DCI may be determined according to various formats, and each format may indicate whether the DCI includes scheduling information (e.g., an UL grant) for UL data, whether the DCI includes scheduling information (e.g., DL resource allocation) for DL data, whether the DCI is a compact DCI having control information of a small size or fall-back DCI, whether spatial multiplexing using multiple antennas is applied, and/or whether the DCI is a DCI for power control. For example, NR DCI format 1_0 or NR DCI format 1_1 may include scheduling for DL data. As another example, NR DCI format 0_0 or NR DCI form 0_1 may include scheduling for UL data.

As described above, FIG. 2 shows an example of a DL and a UL slot structure in the wireless communication system. In particular, FIG. 2 shows a resource grid structure of a 3GPP NR system. Referring to FIG. 2, the slot may include a plurality of OFDM symbols in the time domain, and a plurality of RBs in the frequency domain. The signal may include part or all of the resource grid. In an embodiment, the number of OFDM symbols included in one slot may vary according to the length of a cyclic prefix (CP). Although FIG. 2 illustrates that one slot includes 14 OFDM symbols, the present disclosure is not limited in this regard. That is, the example embodiments shown in FIG. 2 are not intended to limit the configuration of the symbol. Further, a modulation scheme of a generated signal may not be limited to quadrature amplitude modulation (QAM) with a specific value, and may conform to modulation schemes of various communication standards such as, but not limited to, binary phase-shift keying (BPSK) and quadrature phase shift keying (QPSK).

Various embodiments of the present disclosure are described based on the LTE communication system or the NR communication system, for ease of description. However, the content of the present disclosure is not limited thereto and may be applied to various wireless communication systems for transmitting UL control information. In addition, the present disclosure may be applied to an unlicensed band as needed, in addition to a licensed band.

Hereinafter, higher layer signaling and/or a higher signal may refer to a signal transmission method in which a signal is transmitted from the base station 110 to the terminal 120 using a DL data channel of a physical layer, or from the terminal 120 to the base station 110 using a UL data channel of the physical layer. According to an embodiment, the higher layer signaling may be and/or may include at least one of radio resource control (RRC) signaling, signaling according to an F1 interface between a centralized unit (CU) and a distributed unit (DU), or a signal transmission method transmitted through a media access control (MAC) control element (CE). According to an embodiment, the higher layer signaling and/or the higher signal may include system information that may be commonly transmitted to a plurality of terminals 120, for example, a system information block (SIB).

Figure 3A:
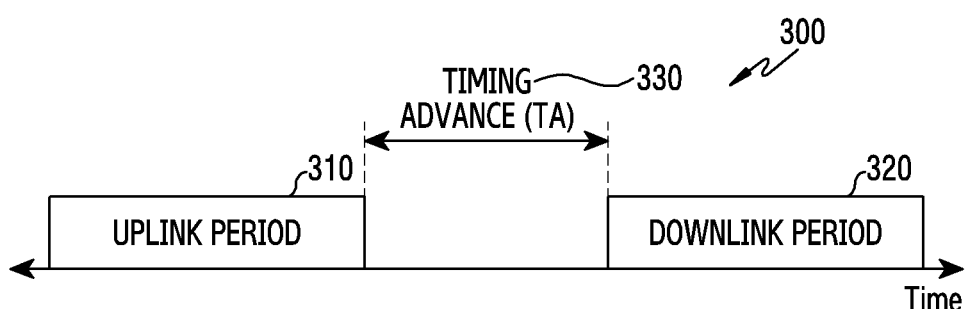
FIG. 3A illustrates an example of a timing advance (TA) period for transmitting an advance signal, according to embodiments.

FIG. 3A illustrates an example 300 of a timing advance (TA) period 330 for transmitting an advance signal, according to embodiments. As used herein, the advance signal may refer to a signal which is pre-transmitted to advance a thermal equilibrium state point before transmitting a DL signal in a DL period 320.

A distance between the base station 110 and each terminal 120 in a cell may differ. Depending on the distance between the base station 110 and each of the terminals 120, a timing at which a signal transmitted by the terminal 120 is received at the base station 110 may differ. The TA may be used to allow the signal from each terminal 120 to arrive at the base station 110 at the same time. The UL TA value 330 of each terminal 120 may be determined by the base station 110. The TA period 330 may be a type of GP and may correspond to a time required for the base station 110 to switch from a reception mode to a transmission mode. In addition, the base station 110 and each of the terminals 120 may synchronize the transmission and reception mode using the above-described GP.

In an embodiment, the TA may be adopted to potentially mitigate collisions between bursts that may be caused by round trip delay in the UL transmission process of the terminal 120. The collision between the bursts may be a problem in which, if the terminal 120 performs the synchronization based on a signal received from the base station 110, bursts transmitted from different terminals 120 in the same radio uplink may overlap with each other due to the transmission delay of the DL and the transmission delay of the UL. The terminal 120 may perform the synchronization using a signal transmitted from the base station 110 or a signal transmitted to the base station 110. The terminal 120 may determine a UL transmission timing 310 based on synchronization information. The terminal 120 may transmit a UL signal by applying the TA to compensate for the transmission delay corresponding to the round trip delay. The TA value of each terminal 120 may be determined by the base station 110.

The base station 110 may determine the TA value for the terminal 120 through an initial TA estimation process. The base station 110 may also determine and update the TA of the terminal 120 through a continuous TA procedure. For example, in a LTE system or in an NR system, the terminal 120 may initiate a random access procedure at a request of the base station 110, in the initial access procedure or to configure UL synchronization. The terminal 120 may transmit a random access signal to the base station 110. The base station 110 may receive the random access signal. The base station 110 may estimate the TA 330 of the terminal 120, based on the received random access signal. If the base station 110 determines the TA value for the terminal 120, the base station 110 may transmit to the terminal 120 a random access response including TA information estimated for the terminal 120. Subsequently, the terminal 120 may apply the TA, in the UL transmission (e.g., physical uplink shared channel (PUSCH) transmission).

According to the NR system, the UL TA period may be determined as a designated value based on a signal standard applied to the wireless communication system and SCS configuration information. Although, for case of description, FIG. 3A illustrates that an end part of the UL period 310 and a beginning part of the TA period 330 coincide, the present disclosure is not limited thereto. For example, in actuality, the TA period may be positioned before the end of the UL signal reception period 310. The TA period may result from the signal propagation delay as described above. Typically, the TA period may pass through a preparation step of the wireless communication system for transmitting a DL signal.

The present disclosure describes a signal (hereinafter, referred to as an advance signal) used before transmitting the DL signal, to advance the heat transfer point of the power amplifier. In an embodiment, the base station 110 may use the above-described TA period to transmit the advance signal.

Figure 3B:
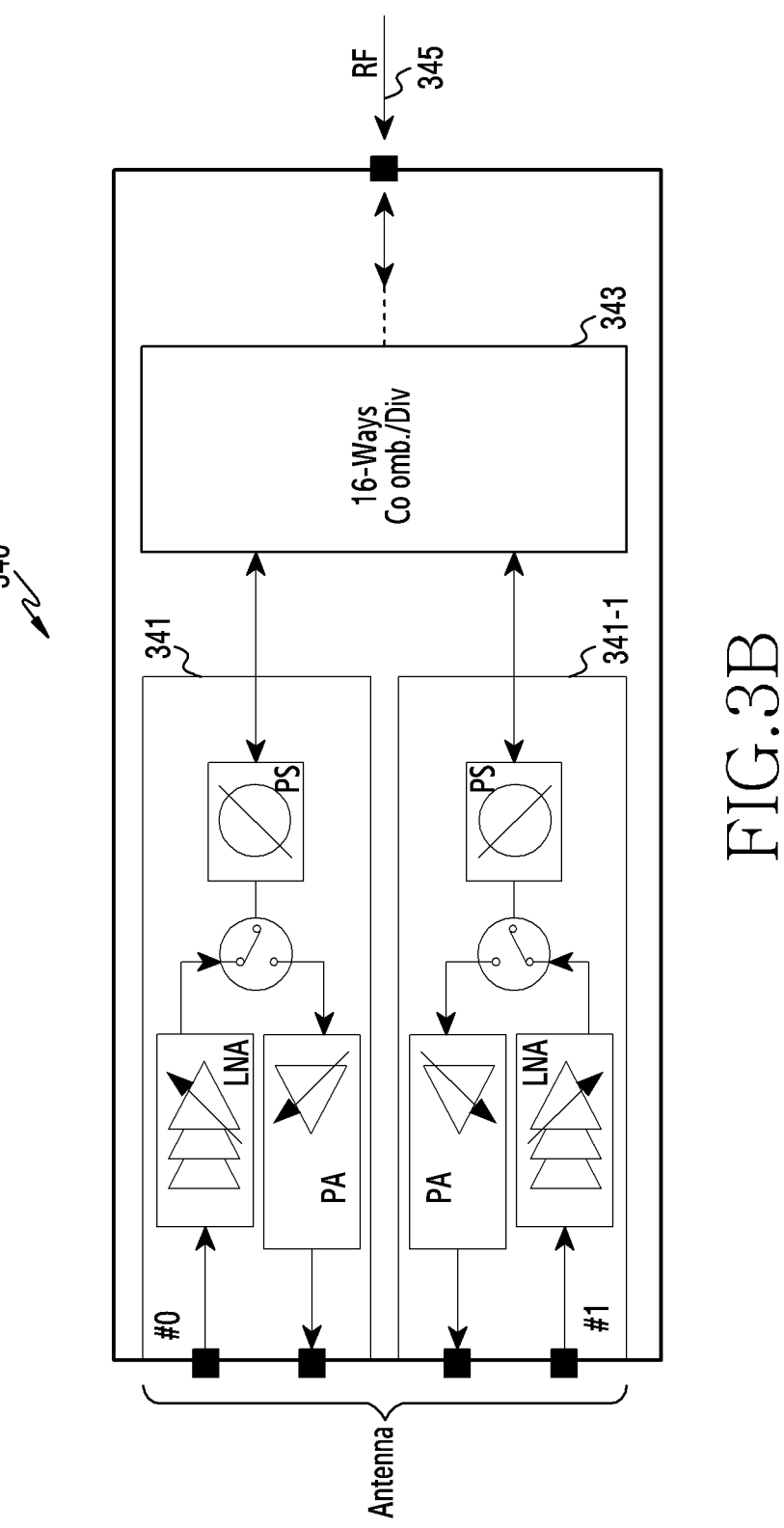
FIG. 3B illustrates an example of a radio frequency integrated circuit (RFIC) including a power amplifier, according to embodiments.

FIG. 3B illustrates an example of a radio frequency integrated circuit (RFIC) including a power amplifier, according to embodiments. FIG. 3B may illustrate the RFIC in a 5G communication millimeter wave (mmWave) band (e.g., frequency range (FR) 2 of 3GPP). For high communication performance in the mmWave band, a high power, highly efficient, and highly linear power amplifier (PA) (e.g., a complementary metal-oxide-semiconductor (CMOS)/silicon (Si)-based PA) may be used in the IC.

Referring to FIG. 3B, an RFIC 340 may include a plurality of RF chains (e.g., first RF chain 341 and second RF chain 341-1). An RF signal 345 inputted to the RFIC 340 may be divided into each RF chain through a divider 343 (or a combiner or a coupler). According to an embodiment, the divider 343 may include a passive element and/or an active element.

The plurality of the RF chains 341 and 341-1 may each include a PA. The PA may be disposed on a transmission path. A transmit signal of the base station 110 or the terminal 120, which is transmitted over the radio channel, may suffer from severe attenuation in the wireless communication system. As a result, a transmitter of the base station 110 or the terminal 120 may be configured to include an amplifier for amplifying the transmit signal. The PA may be disposed in each of the plurality of the RF chains, to amplify the signal transmitted over the air. The PA may amplify and forward the applied signal to the antenna. In an embodiment, the signal passing through the PA may be transferred to an antenna (e.g., an antenna element of an array antenna) through a filter and a transmission line.

As shown in FIG. 3B, the RF signal may be radiated into the air through the transmission path including the PA, or may be transferred to a processor through a reception path including a low noise amplifier (LNA). Although the reception path of the UL signal and the transmission path of the DL signal may be different, the UL signal may affect the DL signal because both paths are connected to the same RF components (e.g., a phase shifter, or another RF component of the RF chain). For example, a UL signal received from the terminal 120 may interfere with a DL signal transmitted by the base station 110. Hence, the base station 110 may be configured to transmit the advance signal for advancing the thermal equilibrium point of the PA, after the reception time of the UL signal, compared to a case where the DL signal is initiated at a DL boundary.

FIG. 3B describes an exemplary structure of an RFIC according to embodiments of the present disclosure. However, the RFIC structure shown in FIG. 3B is merely an embodiment for explaining the transfer process from the RF signal input to the antenna. That is, FIG. 3B is not construed to exclude an RFIC including a PA and/or having a structure different from FIG. 3B from among embodiments of the present disclosure.

FIG. 3B describes the base station 110 as having an mmWave structure by way of example. However, the present disclosure is not limited thereto. For example, embodiments of the present disclosure may be applied to base station equipment such as, but not limited to, a massive multiple-input multiple-output (MIMO) unit (MMU), an integrated access and backhaul (IAB) node, or a terminal 120 using an FRI band (e.g., 3.5 GHZ), as well as the mmWave band.

Embodiments of the present disclosure related to the thermal equilibrium point of the PA are described with reference to FIG. 4.

Figure 4:
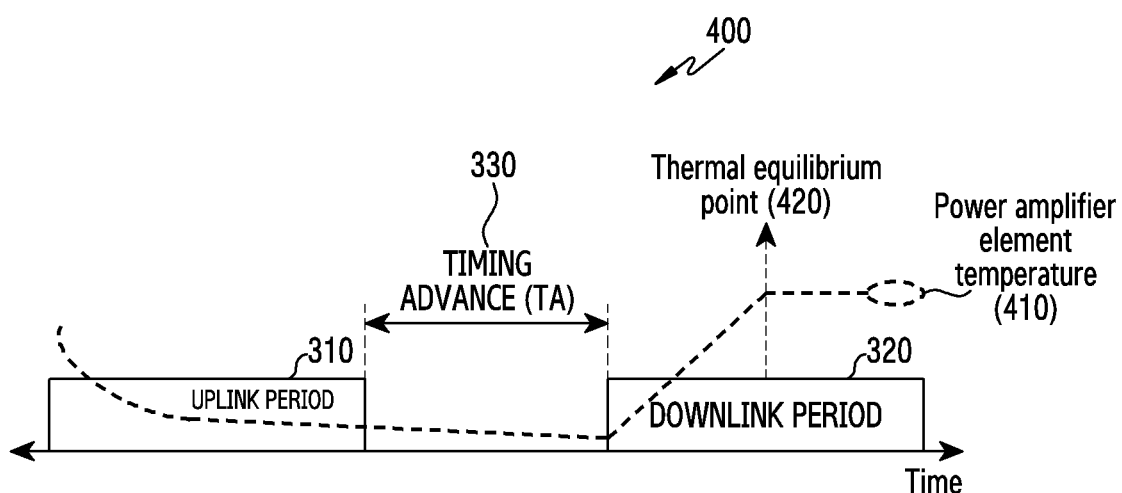
FIG. 4 illustrates an example of a state of a downlink period, if an advance signal is not transmitted, according to embodiments.

FIG. 4 illustrates an example of a state of a DL period 320, if an advance signal is not transmitted, according to embodiments.

Referring to FIG. 4, a UL period 310 and the DL period 320 may exist on the time axis in a communication system to which a conventional TDD communication scheme is applied. A TA period may be defined such that signals transmitted in UL periods (e.g., UL slots, UL subframes, UL symbols) of terminals 120 reach the base station 110 on the same boundary (e.g., resource grid). The TA period, which is one of the GP, may be a time required for the base station 110 to switch from the reception mode to the transmission mode. According to an embodiment, the TA period may be a period for preparing DL signal transmission. According to an embodiment, the base station 110 and each of the terminals 120 may synchronize the transmission and reception mode using the GP.

Although, for ease of description, FIG. 4 illustrates that an end part of the UL period 310 and a beginning part of the TA period 330 coincide, the present disclosure is not limited thereto. In actuality, the timing at which the terminal 120 transmits the UL signal and the timing at which the base station 110 receives the UL signal may differ. That is, there may be a TA period before the end part of the UL signal reception period in the base station 110. The TA period may start prior to the end of the UL period because the terminal 120 may transmit the UL signal by applying the TA, but the timing at which the UL signal actually arrives at the base station 110 may reflect propagation delay.

As shown in FIG. 4, a PA element temperature 410 may differ in the UL period 310 and the DL period 320 according to the TDD communication scheme. This temperature change of the PA element of this element may cause a nonlinear distortion characteristic. To potentially prevent this nonlinear distortion characteristic, the temperature 410 of the PA element may need to reach a thermal equilibrium point 420. The thermal equilibrium state may refer to a state in which that no heat flows, if two or more physical systems are connected in a heat transmission path, for example. Since there is no heat flow in both systems, the thermal equilibrium state may indicate no change in the temperature. Since the thermal equilibrium where the temperature in the system is spatially and temporally constant allows no energy transfer, the system may be determined to be stable. Similarly, in the thermal equilibrium state, the PA in the wireless communication system may improve nonlinearity in the signal transmission as the element is stabilized. The improvement of the nonlinearity may be obtained by measuring a low EVM value in EVM measurement of a first DL symbol.

The EVM may be a measurement value used to compare the transmission signal quality in the wireless communication system. The EVM may be and/or may include a measure of a modulation quality of a modulated signal within a specific spectrum band in a digital communication system. The EVM may be one of indicators indicative of digital signal reception performance and may indicate how far a point is from an original signal vector. A relationship between a signal to noise ratio (SNR) value, which is another communication quality indicator, and the EVM value may be represented as an equation similar to Equation 1.

$$EVM = \sqrt{\frac{1}{SNR}} \qquad \text{[Equation 1]}$$

Referring to Equation 1, EVM may represent the error vector value, and SNR may represent the signal to noise ratio.

Carrier leakage, phase noise, and noise of the communication signal may exhibit a high EVM measurement value. Thus, a high EVM measurement value may indicate communication quality deterioration. As described above, if the PA element is in the thermal equilibrium state, a low EVM measurement value may be exhibited.

By contrast, if the PA element is not in thermal equilibrium state, that is, if there is a temperature change in the element, the system of the element may be determined to be unstable. The unstable system of the element may cause a non-linear distortion characteristic of the signal. The non-linear distortion characteristic of the signal may cause signal quality deterioration such as noise. Alternatively or additionally, the signal quality deterioration may exhibit a high EVM value. To improve the EVM of the signal and to ensure high communication quality, the PA element may need to be in the thermal equilibrium state during the signal transmission. Referring to FIG. 4, the temperature 410 of the PA element may not increase until the start point of the DL period 320. The start point of the DL period may indicate a starting point at which a DL signal resource may be allocated according to the TDD resource configuration. Since no signal is transmitted through the PA in a period before the DL transmission start, the temperature of the PA may be relatively low at the beginning part of the DL period. In the beginning part of the DL period, the PA element may not be in the thermal equilibrium state. In other words, the PA element may not be in the stable state. That is, the low PA temperature (e.g., the unstable state) may cause the nonlinear distortion characteristic of the PA. And by extension, the nonlinear distortion characteristic may cause the communication quality deterioration.

To address the communication quality deterioration, embodiments of the present disclosure provide a method for potentially improving the PA to be in the thermal equilibrium state when the PA transmits a signal. The embodiments of the present disclosure further provide a method for adjusting a thermal equilibrium point such that the thermal equilibrium point 420 of the PA element is placed before the DL transmission start. For example, if the temperature of the PA element reaches the thermal equilibrium state before the base station 110 transmits the DL signal, the non-distortion characteristic of the signal by the power amplifier may be improved. According to embodiments of the present disclosure, a method for advancing the thermal equilibrium point 420 by transmitting an advance signal in a specific period between the end point of the UL signal reception and the start point of the DL period 320 is provided. Hereafter, a method for adaptively adjusting the temperature of the PA element is described.

Figure 5A:
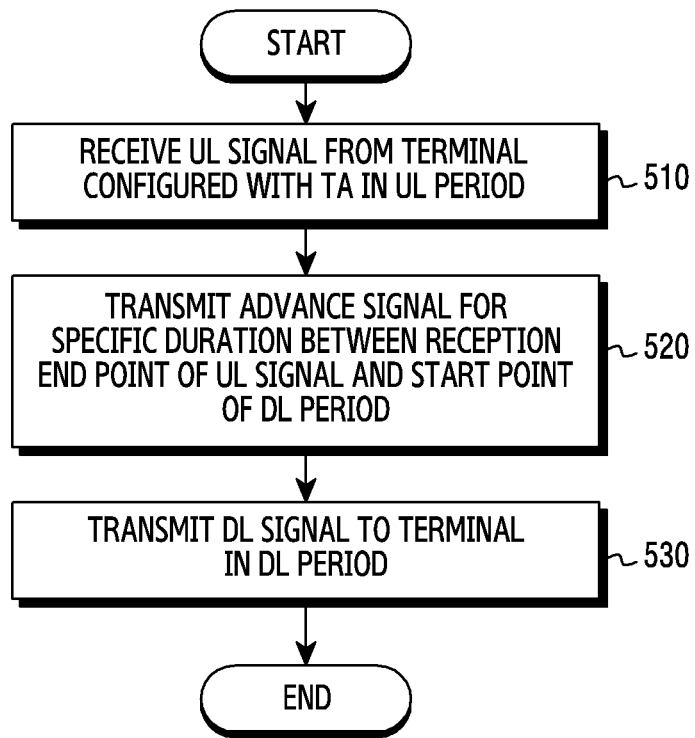
FIG. 5A illustrates an operation flow of a base station for transmitting an advance signal, according to an embodiment.

FIG. 5A illustrates an operation flow of a base station 110 for transmitting an advance signal according to an embodiment. The advance signal may refer to an advance signal 640 of FIG. 6 to be described. A UL period or a DL period 620 in FIG. 5A indicates a period according to the TDD configuration.

Referring to FIG. 5A, in operation 510, the base station 110 may receive a UL signal from a terminal 120 configured with the TA in a UL period 610. According to an embodiment, the UL signal received from each of the terminals 120 may be at least one of a PUSCH, a physical uplink control channel (PUCCH), or an SRS. According to an embodiment, timings of receiving the UL signals received from the terminals 120 having different distances from the base station 110 may differ. The terminal 120 may be at least one terminal 120 from among the plurality of the terminals 120 within coverage of the base station 110. According to an embodiment, the plurality of the terminals 120 in the coverage of the base station 110 may reside at different distances from the base station 110. Alternatively or additionally, each of the terminals of the plurality of the terminals 120 may be stationary and/or moving. Thus, the TA value may be configured for a corresponding terminal 120, to place the UL signal of each terminal 120 at the UL boundary of the base station 110.

In operation 520, the base station 110 may transmit an advance signal during a specific (e.g., predetermined) period between the reception end point of the UL signal and the start point of the DL period 620. The base station 110 may transmit the advance signal 640 during at least one slot or at least one symbol. According to an embodiment, transmitting the advance signal 640 may include identifying the TA value configuration for the terminal 120, identifying the specific period for transmitting the advance signal 640 based on the TA value and generating the advance signal 640. The period according to the TA value configuration for the terminal 120 may be referred to as a TA period 630. The specific period for transmitting the advance signal 640 may be included in the TA period 630. As described above, a beginning part of the TA period 630 may not match an end part of the UL period 610. However, if the advance signal 640 overlaps the UL period 610, signal interference may occur. The signal interference may degrade the communication quality. Accordingly, the specific period for transmitting the advance signal 640 may be identified (or determined) based on the TA period 630, to prevent the signal interference and to potentially avoid degradation of communication quality. The base station 110 may identify (or determine) the specific period between the end point of the UL period 610 and the start point of the DL period 620.

In operation 530, the base station 110 may transmit a DL signal to the terminal 120 in the DL period 620. The PA element may reach the thermal equilibrium state, that is, the stabilization period through the transmission of the advance signal 640. Linearization may be normally applied to the DL symbol in the stabilization period. Compared to no transmission of the advance signal 640, a lower EVM value may be measured, and higher communication quality may be attained.

Figure 5B:
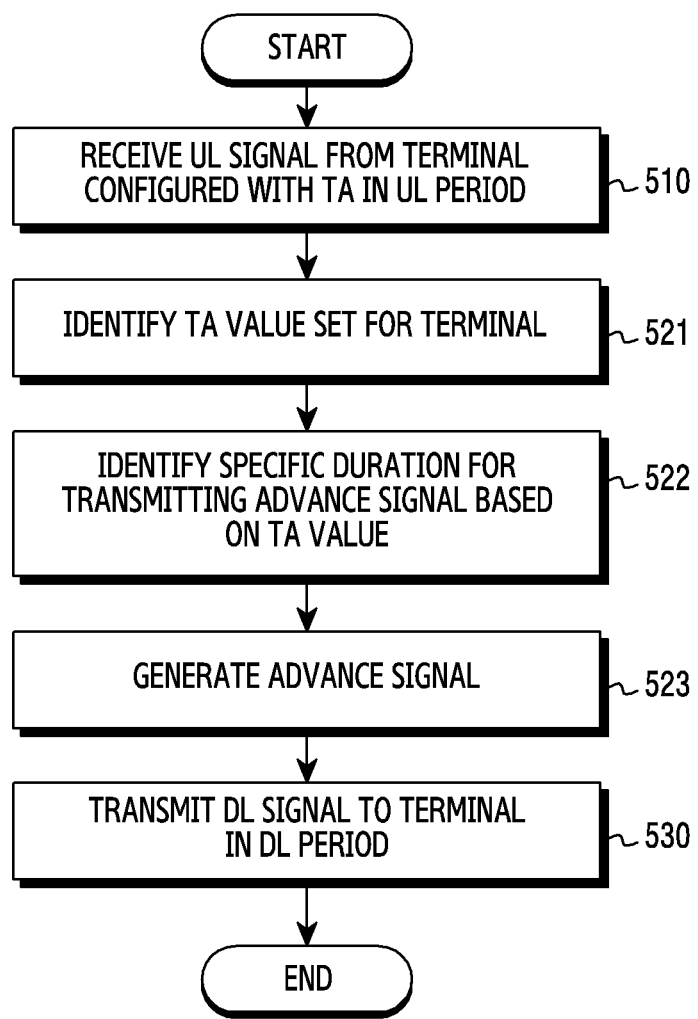
FIG. 5B illustrates an operation flow of a base station for generating and transmitting an advance signal, according to an embodiment.

FIG. 5B illustrates an operation flow of the base station 110 for generating and transmitting the advance signal according to an embodiment. FIG. 5B is a diagram elaborating the process of operation 520 of FIG. 5A.

Referring to FIG. 5B, in operation 510, the base station 110 may receive the UL signal from the terminal 120 configured with the TA in the UL period 610. Operation 510 of FIG. 5B may include and/or may be similar in many respects to the operation 510 described above with reference to FIG. 5A, and may include additional features not described above.

In operation 521, the base station 110 may identify the TA value configured to the terminal 120. The reception timing of an initial UL signal for a specific terminal 120 at the receiving stage of the base station 110 may be compared with the start point of the UL radio resource allocated by the base station 110 to the corresponding terminal 120. In this case, there may be a difference corresponding to the propagation delay in the synchronization process and the propagation delay in the UL signal transmission process, that is, the round trip delay between the base station 110 and the terminal 120. Thus, the terminal 120 may need to transmit the UL signal by applying the TA to compensate for the transmission delay corresponding to the round trip delay. The TA value of each terminal 120 may be determined by the base station 110.

In operation 522, the base station 110 may identify the specific (e.g., predetermined) period for transmitting the advance signal 640 based on the TA value. The specific period for transmitting the advance signal 640 may be included in the TA period 630 based on the TA value configured to the terminal 120. As described above, the beginning part of the TA period 630 may not match the end part of the UL period 610. However, if the advance signal 640 overlaps the UL period 610, the signal interference may occur. The signal interference may degrade the communication quality. To potentially prevent the signal interference and to potentially avoid degradation of communication quality, the base station 110 may generate the specific period of the advance signal 640 based on the TA period 630, between the end point of the UL period 610 and the start point of the DL period 620.

According to an embodiment, the base station 110 may consider the SCS of the UL and DL signals in configuring the TA value for the terminal 120. According to an embodiment, the specific period of the advance signal 640 may be identified based on at least one of the SCS of the UL signal or the SCS of the DL signal.

According to an embodiment, the specific period of the advance signal 640 may be identified based on at least one of the element state or the thermal equilibrium state information of the PA. As an example, the PA element of the base station 110 may be configured in various manners. Physical properties of the PA element may be individually different. Herein, the individual physical properties may include, but not be limited to, a thermal expansion coefficient, an electrical conductivity, a specific resistance, or a specific heat. The PA for the signal transmission of the base station 110 may have different characteristics such as, but not be limited to, thermal expansion coefficient, an electrical conductivity, a specific resistance, or a specific heat, depending on a type of the PA element. According to an embodiment, variables such as temperature change and time to reach the thermal equilibrium state may be identified based on the physical properties of the element itself. If the thermal expansion coefficients of the PA elements are different, the elements each, which receives the same temperature change (e.g., the same heat) may differ in the timing of reaching the thermal equilibrium state because distances of constituent molecules are different from each other. As such, the element state of the PA having different physical properties such as different specific heat and/or specific resistance may differ in the duration of the advance signal 640 required to reach the thermal equilibrium point 420. According to an embodiment, a temperature increase rate of the PA may vary according to the PA element state. In addition, the thermal equilibrium state information may vary according to the PA element state, and the thermal equilibrium state information may include the heat and/or the temperature that may be needed to reach the thermal equilibrium state.

According to an embodiment, a control unit (e.g., a processor) of the base station 110 device may identify the advance signal 640 corresponding to the individual characteristics of the PA element state. For example, if the temperature change of the PA element is small with respect to the same quantity of the heat, the duration of the advance signal 640 for reaching the thermal equilibrium state may be long. In addition, if a temperature corresponding to the thermal equilibrium state of the PA element is high, the required duration of the advance signal 640 may be longer than that of the element having a low thermal equilibrium temperature. Hence, the specific duration for generating the advance signal 640 may be adaptively adjusted according to the state or the thermal equilibrium state information of the PA element. As described above, if the PA characteristics are different, PAs having different elements may differ in time for reaching the thermal equilibrium point 420. In other words, the PAs having the different characteristics may differ in the thermal equilibrium point 420, that is, in the timing of exhibiting no temperature change of the PA element. As such, if the period of the advance signal 640 is identified based on the state or the thermal equilibrium state of the individual PA, efficient signal transmission may be enabled and unnecessary power loss of the base station 110 may be prevented.

According to an embodiment, a signal strength of the advance signal 640 may be identified according to the TA value or the PA state information. The signal strength of the advance signal 640 may be an amplitude of the advance signal 640. As the amplitude of the signal increases, the amount of the heat generated by the element for the signal may increase. As the amplitude of the signal increases, a noise temperature of the element may also increase. Hence, within the same time duration, as the amplitude of the advance signal 640 increases, the temperature of the PA element may also increase. Considering the relationship between the temperature and the amplitude described above, the base station 110 may adaptively adjust the amplitude of the advance signal 640, within the specific duration for transmitting the advance signal 640. For example, if the temperature change required for the PA element to reach the thermal equilibrium state is considerable, the amplitude of the advance signal 640 may be increased. Even if the PA element is not sensitive to the thermal change, the temperature change of the PA element may be increased by increasing the amplitude of the advance signal 640. Depending on the amplitude of the advance signal 640, the thermal equilibrium point 720 of the PA element may precede the start of the DL period 620, despite the PA element state insensitive to the thermal change. However, unlimited amplification of the amplitude of the advance signal 640, which may cause unnecessary power loss and inefficiency, may need to be appropriately adjusted. By contrast, if the PA element is sensitive to the thermal change, an appropriate amplitude of the advance signal 640 may be configured in response. According to an embodiment, the amplitude of the advance signal 640 may be identified based on the TA value configured to the terminal 120. For example, if the TA period 630 is shorter than the required period of the advance signal 640 identified to potentially reduce or avoid degradation of communication quality, the amplitude of the advance signal 640 may be increased. Even if the specific duration of the advance signal 640 is short, it may be possible to increase the temperature change of the PA element by increasing the amplitude of the advance signal 640.

As the amplitude of the advance signal 640 is controlled, even if the specific duration for transmitting the advance signal 640 is relatively small, the thermal equilibrium point 720 of the PA element may precede the start of the DL period 620. That is, the base station 110 may identify the amplitude of the advance signal 640 based on a reserved period for the transmission of the advance signal 640. Since the unrestricted amplification of the advance signal amplitude may cause unnecessary power waste and inefficiency, the base station 110 may identify the amplitude, in consideration of a current power state and PA efficiency. By contrast, if the TA period 630 is longer than the necessary period of the advance signal 640 to potentially reduce or avoid degradation of communication quality, an appropriate amplitude of the advance signal 640 may be configured accordingly. According to an embodiment, to avoid the unnecessary power waste, an appropriate amplitude of the advance signal 640 may be identified such that the thermal equilibrium point 720 may precede the DL first symbol.

In operation 523, the base station 110 may generate the advance signal 640. According to an embodiment, the advance signal 640 transmitted to advance the heat transfer may be a dummy signal. According to an embodiment, the advance signal 640 transmitted to advance the heat transfer may be a designated sequence. According to an embodiment, communication information may be included in the advance signal 640 transmitted to advance the heat transfer. According to an embodiment, the communication information may be a dummy signal for channel occupancy of a shared spectrum in unlicensed band communication. However, the communication information may be and/or may include any information which may be transmitted by the base station 110, before the DL transmission, and is not limited to information for the channel occupation. The advance signal 640 may advance the thermal equilibrium point 420 of the PA, and may be generated only for adjusting the amplification regardless of the information that may be carried by the signal. Thus, by utilizing the transmission of the advance signal, the transmission including necessary communication information may be enabled.

In operation 530, the base station 110 may transmit a DL signal to the terminal 120 in the DL period 620. The description on operation 530 may adopt the description on operation 530 of FIG. 5A in the same or similar manner. Operation 530 of FIG. 5B may include and/or may be similar in many respects to the operation 530 described above with reference to FIG. 5A, and may include additional features not described above FIG. 6 illustrates an example of transmission of an advance signal 640, according to an embodiment.

Figure 6:
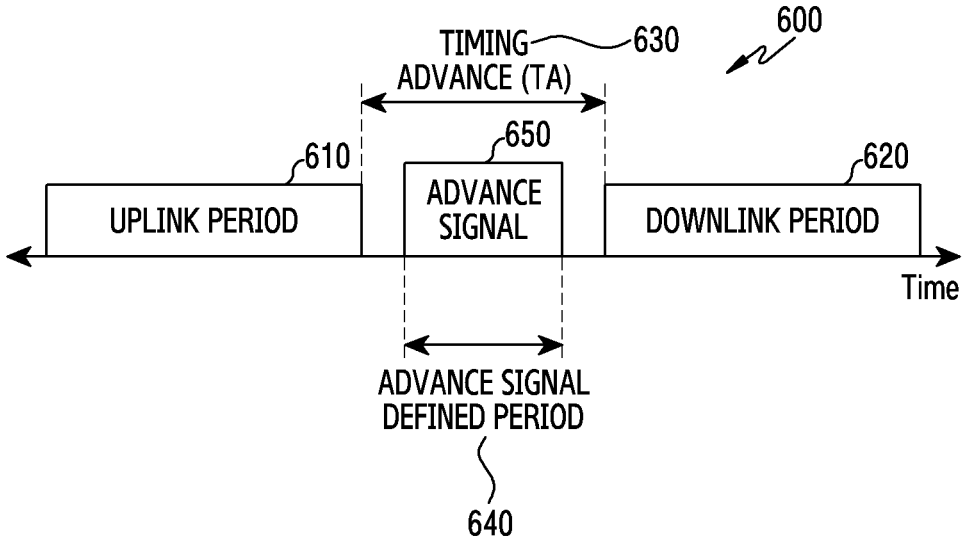
FIG. 6 illustrates an example of advance signal transmission, according to an embodiment.

Referring to FIG. 6, a UL period 610 and a DL period 620 may exist on the time axis in a communication system to which the TDD communication scheme is applied. In a time period between the UL period 610 and the DL period 620, a TA period 630 for compensating for propagation delay of each terminal 120 may be positioned. The corresponding TA period 630 may be a type of GP and may correspond to a time needed by the base station 110 to switch from the reception mode to the transmission mode. Alternatively or additionally, the base station 110 and the terminal 120 may synchronize the transmission and reception modes using the GP.

As shown in FIG. 6, the advance signal 640 may be generated and transmitted in a period of the advance signal 640 of the TA period 630. A specific (e.g., predetermined) duration for transmitting the advance signal 640 may include all or a part of the TA period 630. According to an embodiment, the specific duration of the advance signal 640 may be identified (or determined) based on at least one of a UL signal SCS or a DL signal SCS. According to an embodiment, the specific duration of the advance signal 640 may be identified based on at least one of the element state or the thermal equilibrium state information of the PA. According to an embodiment, the signal strength of the advance signal 640 may be identified according to the TA value or the PA state information. According to an embodiment, communication information may be included in the advance signal 640 transmitted to advance the heat transfer. According to an embodiment, if the temperature change rate of the PA element is smaller than a predefined threshold, the PA element may be determined to reach the thermal equilibrium state.

Figure 7:
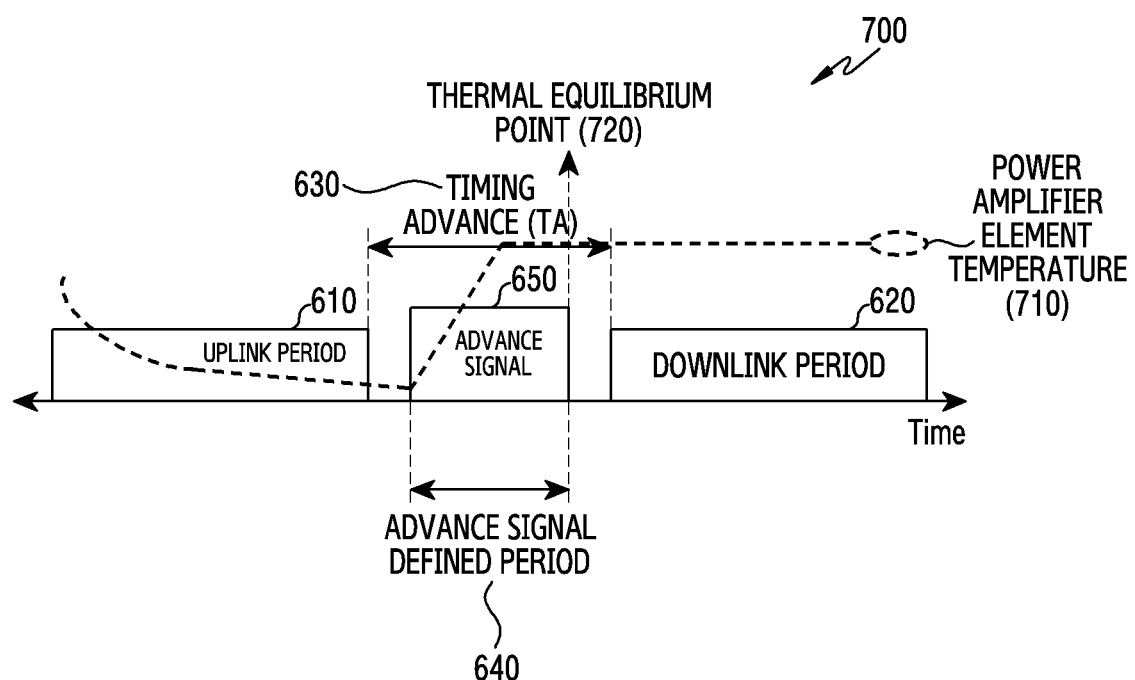
FIG. 7 illustrates an example of a state of a downlink period, if an advance signal is transmitted, according to an embodiment.

FIG. 7 illustrates an example of a state of a DL period 620, if an advance signal 640 is transmitted according to an embodiment.

Referring to FIG. 7, as described above, according to an embodiment, the advance signal 640 may be transmitted within a TA period 630 included in the TDD communication system. As such, the advance signal 640 may be transmitted and the heat transfer of the PA element occurring at the start of the DL period 620 may be advanced. Further, the thermal equilibrium state of the PA in the DL period 620 may be achieved more quickly. Hence, if the base station 110 transmits a DL signal, a temperature 710 of the PA element may not change. That is, the PA element may be in the thermal equilibrium state. In the thermal equilibrium state where the temperature in the system is spatially and temporally constant, the transfer of the energy may not be allowed, and accordingly, the system may be determined to be stable. Similarly, if the PA of the wireless communication system is in the thermal equilibrium system, the element may be stable and the nonlinearity in the signal transmission may be improved. This improvement may be identified by measuring a low EVM value in the EVM measurement of the first DL symbol. As described above, if the PA element is in the thermal equilibrium state, the EVM measurement value may be low. Similarly it may be possible to improve the nonlinearity of the DL first symbol occurring in the conventional TDD communication system. Further, the temperature of the PA element may be adaptively adjusted individually according to a specific situation (e.g., the PA element state, the TA period).

According to an embodiment, a specific (e.g., predetermined) duration of the advance signal 640 may be identified based on at least one of the SCS of the UL signal or the SCS of the DL signal. The NR system may operate various numerologies to support various services. For UL synchronization, the terminal 120 may receive a TA command from the base station 110. Based on a value included in the TA command transmitted from the base station 110 and the applied numerology, the terminal 120 may determine the TA value to be applied. Hence, in the TDD system, the TA value configured to the terminal 120 may vary according to the SCS of the signal.

The base station 110 may consider the SCS of the UL and DL signals in configuring the TA value for the terminal 120. According to an embodiment, the specific duration of the advance signal 640 may be identified based on at least one of the SCS of the UL signal or the SCS of the DL signal. According to an embodiment, the specific duration of the advance signal may be identified based on an SCS associated with the BWP through which the UL signal may be received. According to an embodiment, the specific duration of the advance signal may be identified based on an SCS associated with the BWP through which the DL signal may be transmitted.

According to an embodiment, the specific duration of the advance signal 640 may be identified based on at least one of the element state or the thermal equilibrium state information of the PA. As an example, the PA element of the base station 110 may be configured variously. Physical properties of the PA element may individually differ. For example, the individual physical properties may include, but not be limited to, the thermal expansion coefficient, the electrical conductivity, the specific resistance, or the specific heat. The PA for the signal transmission of the base station 110 may have different characteristics such as, but not be limited to, thermal expansion coefficient, electrical conductivity, specific resistance, or specific heat, depending on the type of the PA element. Based on the above, the zeroth law of thermodynamics may be considered to take into account the thermal equilibrium state, as represented by an equation similar to Equation 2.

$$Q = m \times C \times \Delta t \qquad \text{[Equation 2]}$$

Referring to Equation 2, Q may represent a heat quantity of the system, m may represent a mass of an object, C may represent the specific heat, and $\Delta t$ may represent the temperature change.

Based on Equation 2, the heat quantity Q may be obtained through the heat transfer of the PA element, and whether the PA element is in the thermal equilibrium state may be identified (or determined) based on the heat quantity difference between the PA element and the outside. In addition, variables such as temperature change and time to reach the thermal equilibrium state may be identified based on the physical properties of the element itself. If the expansion coefficient of the PA element is different, the elements each, which receives the same temperature change (e.g., the same heat) may differ in the timing of reaching the thermal equilibrium state because distances of constituent molecules may be different from each other. As such, the element state of the PA having the different physical property such as different specific heat and specific resistance may differ in the duration of the advance signal 640 required to reach the thermal equilibrium point 420. According to an embodiment, a temperature increase rate of the PA may vary according to the PA element state. In addition, the thermal equilibrium state information may vary according to the PA element state. The thermal equilibrium state information may be and/or may include, but not be limited to, the heat and/or the temperature needed to reach the thermal equilibrium state. For example, if the temperature change of the PA element is small with respect to the same amount of the heat, the period of the advance signal 640 for reaching the thermal equilibrium state may be long. Alternatively or additionally, if the temperature corresponding to the thermal equilibrium state of the PA element is high, the required period of the advance signal 640 may be longer than that of the element having a low thermal equilibrium temperature. Hence, the specific duration of the advance signal 640 may need to vary according to the state or the thermal equilibrium state information of the PA element. If the PA characteristics are different, a PA having a different element may differ in time for reaching the thermal equilibrium point 420.

According to an embodiment, the control unit (e.g., the processor) of the base station 110 device may identify the advance signal 640 corresponding to the individual characteristics of the PA element state. For example, the base station 110 may identify an RF path associated with the DL signal to transmit. The base station 110 may identify PA element information corresponding to a corresponding RF path. The base station 110 may identify an offset corresponding to the identified element information. The base station 110 may identify an advance signal period, based on the offset and the TA value configured to the corresponding terminal 120. A PA having different characteristics may differ in the thermal equilibrium point 420. For example, the timing of reaching no temperature change of the PA element may be different. According to the above-described embodiments, if the period of the advance signal 640 is identified based on the individual PA state or the thermal equilibrium state, efficient signal transmission may be enabled and unnecessary power loss of the base station 110 may be prevented.

If the TA period 630 is shorter than the period of the identified advance signal 640 needed to potentially avoid degradation of communication quality, the advance signal period may not be sufficiently secured. In an embodiment, the arrangement of the base station 110 may be adjusted to improve the securing of the advance signal period. The adjusted component arrangement of the base station 110 may illustrate the arrangement of each element of the RFIC 340 as shown in FIG. 3B. Through the component rearrangement of the RFIC, an interval or a location, or arrangement of a transmission line between the UL receiver and the DL transmitter may differ for each antenna path (one transmission path and one reception path correspond to the antenna path). As a result of the rearrangement, interference of each transmit and receive signal may be prevented or minimized, by considering state information related to the thermal equilibrium of each PA.

According to a further embodiment, the base station 110 may identify a required PA among a set of a plurality of PAs. If the TA period 630 is shorter than the period of the advance signal 640 needed to potentially avoid degradation of communication quality, a different element of the PA may be selected. According to an embodiment, the base station 110 may reduce the period of the advance signal 640, by selecting an element which may be sensitive to the signal and may be subject to a rapid temperature change. By contrast, if the TA period 630 is longer than the period of the advance signal 640 needed to potentially avoid degradation of communication quality, the base station 110 may adjust the transmission timing of the advance signal 640. According to an embodiment, to prevent the unnecessary power waste and the communication quality degradation, the start point and the period of the advance signal 640 may be identified (or determined) such that the thermal equilibrium point 720 may precede the first DL symbol.

According to an embodiment, the signal strength of the advance signal 640 may be identified according to the TA value or the PA state information. The signal strength of the advance signal 640 may be and/or may include the amplitude of the advance signal 640. As the amplitude of the signal increases, the quantity of the heat generated by the element for the signal may increase. A relationship between a noise voltage value and the temperature may be represented as an equation similar to Equation 3.

$$V_n^2 = 4 \times K \times T \times B \times R \qquad \text{[Equation 3]}$$

Referring to Equation 3, $V_n$ may represent the noise voltage value, K may represent a Boltzmann constant, T may represent an absolute temperature or a noise temperature, B may represent a bandwidth, and R may represent a resistance value.

As shown in Equation 3, as the amplitude of the signal increases, the noise temperature of the element may also increase. Hence, within the same time duration, as the amplitude of the advance signal 640 increases, the temperature of the PA element may also increase. Considering the above, the amplitude of the advance signal 640 may be adaptively adjusted, within the specific duration for the transmission of the advance signal 640. For example, if a temperature change required for the PA element to reach the thermal equilibrium state is considerable, the amplitude of the advance signal 640 may be increased. Even if the PA element is not sensitive to the thermal change, the temperature change of the PA element may be increased by increasing the amplitude of the advance signal 640. Depending on the amplitude of the advance signal 640, the thermal equilibrium point 720 of the PA element may precede the start of the DL period 620, despite the PA element state being insensitive to the thermal change. However, unlimited amplification of the amplitude of the advance signal 640, which may cause unnecessary power loss and inefficiency, may need to be appropriately adjusted. Alternatively, if the PA element is sensitive to the thermal change, an appropriate amplitude of the advance signal 640 may be configured accordingly. According to an embodiment, the amplitude of the advance signal 640 may be identified based on the TA value configured to the terminal 120. For example, if the TA period 630 is shorter than the needed period of the advance signal 640 identified to potentially avoid degradation of communication quality, the amplitude of the advance signal 640 may be increased. Even if the specific duration of the advance signal 640 is short, it may be possible to increase the temperature change of the PA element by increasing the amplitude of the advance signal 640. Depending on the amplitude of the advance signal 640, the thermal equilibrium point 720 of the PA element may precede the start of the downlink period 620, despite the small specific duration for transmitting the advance signal 640. However, since the unlimited amplification of the amplitude of the advance signal 640 may cause unnecessary power waste and inefficiency, it may need to be adjusted appropriately.

Alternatively, if the TA period 630 is longer than the period of the advance signal 640 needed to potentially avoid degradation of communication quality, an appropriate amplitude of the advance signal 640 may be configured in response. According to an embodiment, to avoid the unnecessary power waste, an appropriate amplitude of the advance signal 640 may be identified such that the thermal equilibrium point 720 may precede the DL first symbol.

The advance signal 640 transmitted to advance the heat transfer timing may be a dummy signal for channel occupancy of an unlicensed band (or a shared spectrum). The base station 110 may transmit the advance signal to prevent channel occupancy of another node and to advance the thermal equilibrium point of the PA. According to another embodiment, the advance signal may include communication information. The communication information may indicate a payload which may be transmitted by the base station 110, before the DL transmission. The advance signal 640 may advance the thermal equilibrium point 720 of the PA, and may be generated only for adjusting the amplification regardless of the information that may be carried by the signal. Hence, the transmission of the advance signal may reduce overhead, by transmitting necessary communication information together.

According to an embodiment, if the temperature change rate of the PA element is smaller than a predefined threshold, the PA element may be determined to reach the thermal equilibrium state. In an embodiment, the control unit of the base station 110 may include a temperature change detection unit for detecting the temperature change of the PA element. The temperature change detection unit may obtain the temperature change value of the element by sensing the temperature of the PA element per time. If the obtained temperature change value falls below the predefined threshold, the PA element may be determined to reach the thermal equilibrium state. In this case, the advance signal transmission may not be needed any more, and the transmission of the advance signal 640 may be stopped. As the PA element may be determined to reach the thermal equilibrium state, a DL signal may be transmitted. In view of preventing the unnecessary power waste, a minimum specific period for transmitting the advance signal 640 for reaching the thermal equilibrium state may be determined, through the operation of the temperature change detection unit as described above. Alternatively, if the obtained temperature change value is greater than the predefined threshold, the PA element may be determined as not reaching the thermal equilibrium state. In such a case, the PA element may require continuous transmission of the advance signal 640 to obtain a higher temperature. The temperature change detection unit may continuously (or relatively frequently) detect the temperature of the PA element, and stop transmitting the advance signal 640, if the temperature change value of the element falls below the predefined threshold.

According to an embodiment, the control unit of the base station 110 device may include a thermal equilibrium detection unit for identifying whether the PA element is in the thermal equilibrium state based on the temperature value of the element. The thermal equilibrium detection unit may include the above-described temperature change detection unit. If the thermal equilibrium detection unit determines that the PA element is in the thermal equilibrium state, the base station 110 may not need to generate or transmit the advance signal 640. That is, the base station 110 device may achieve the power waste prevention and efficient signal transmission, by not generating or transmitting the unnecessary advance signal 640.

Figure 8:
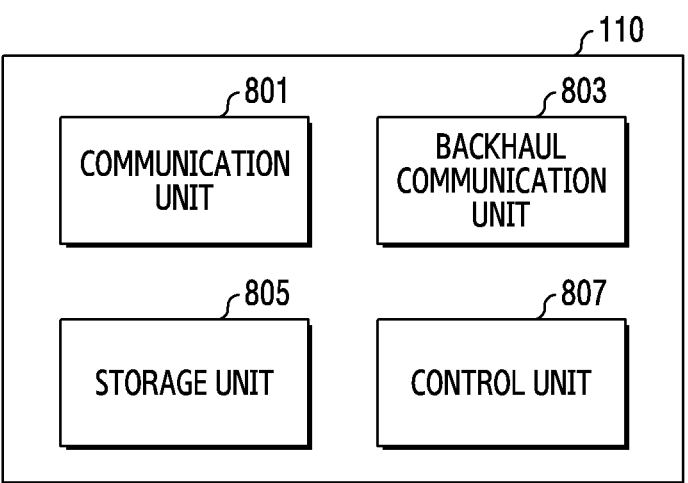
FIG. 8 illustrates a functional configuration of a base station in a wireless communication system, according to embodiments.

FIG. 8 illustrates a functional configuration of a base station 110 in a wireless communication system, according to embodiments. A term such as '~unit' or '~er' used hereinafter may indicate a unit for processing at least one function or operation, and may be implemented using hardware, software, or a combination of hardware and software.

Referring to FIG. 8, the base station 110 may include a communication unit 801, a backhaul communication unit 803, a storage unit 805, and a control unit 807.

The communication unit 801 performs may perform functions for transmitting and/or receiving a signal over a radio channel. For example, the communication unit 801 may perform a conversion function between a baseband signal and a bit stream according to a physical layer standard of the system. As another example, in data transmission, the communication unit 801 may generate complex symbols by encoding and/or modulating a transmit bit stream. Additionally, in data reception, the communication unit 801 may restore a received bit stream by demodulating and/or decoding a baseband signal. The communication unit 801 may be configured to perform at least one of the operations of the transmitter or the operations of the receiver described in FIGS. 1 through 5. According to an embodiment, the communication unit 801 may be configured to receive a UL signal from the terminal 120.

The communication unit 801 may up-convert the baseband signal into an RF band signal, transmit the up-converted signal via an antenna, and down-convert an RF band signal received via the antenna into a baseband signal. The communication unit 801 may include a transmit filter, a receive filter, an amplifier, a mixer, an oscillator, a digital-to-analog converter (DAC), an analog-to-digital converter (ADC), and the like. Additionally, the communication unit 801 may include a plurality of transmit and/or receive paths. Further, the communication unit 801 may include at least one antenna array including a plurality of antenna elements. In terms of hardware, the communication unit 801 may include a digital unit and/or an analog unit, and the analog unit may include a plurality of sub-units according to operating power, operating frequency, and the like. According to an embodiment, the communication unit 801 may include a unit for forming a beam, that is, a beamforming unit. For example, the communication unit 801 may include an MMU for the beamforming.

The communication unit 801 may transmit and/or receive a signal. The communication unit 801 may include at least one transceiver. For example, the communication unit 801 may transmit a synchronization signal, a reference signal, system information, a message, control information, data, and/or the like. Alternatively or additionally, the communication unit 801 may perform the beamforming. The communication unit 801 may apply a beamforming weight to the signal, to give direction to the signal to be transmitted and/or received according to the configuration of the control unit 807. According to an embodiment, the communication unit 801 may generate a baseband signal according to a scheduling result and a transmit power calculation result. In addition, an RF unit in the communication unit 801 may transmit the generated signal via the antenna.

The communication unit 801 may transmit and/or receive the signal as described above. Accordingly, all or a part of the communication unit 801 may be referred to as a transmitter, a receiver, or a transceiver. In addition, transmission and reception of signals described in the following description may be interpreted as being performed by the communication unit 801 as described above.

The backhaul communication unit 803 may provide an interface for communicating with other nodes in the network. That is, the backhaul communication unit 803 may convert a bit stream transmitted from the base station 110 to other node (e.g., another access node, another base station 110, an upper node, or a core network), into a physical signal, and may convert a physical signal received from another node into a bit stream.

The storage unit 805 may store data such as, but not limited to, a basic program for operation of the base station 110, an application program, and/or configuration information. The storage unit 805 may include a memory. For example, the storage unit 805 may include a volatile memory, a non-volatile memory, and/or a combination of a volatile memory and a non-volatile memory. The storage unit 805 may provide the stored data at a request of the control unit 807.

The control unit 807 may control general operations of the base station 110. For example, the control unit 807 may transmit and/or receive a signal through the communication unit 801 and/or the backhaul communication unit 803. In addition, the control unit 807 may record and/or read data in and/or from the storage unit 805. The control unit 807 may perform functions of a protocol stack required by a communication standard. As such, the control unit 807 may include at least one processor. According to various embodiments, the control unit 807 may control the base station 110 to perform operations, according to various embodiments of the present disclosure. According to an embodiment, the control unit 807 may estimate a UL channel.

According to an embodiment, the control unit 807 may be configured to receive a UL signal from the terminal 120 configured with the TA in the UL period 610, according to the TDD configuration, and to transmit the advance signal 640 in the specific duration between the end point of the UL signal reception and the start point of the DL period 620 of the TDD configuration and a DL signal to the terminal 120 in the DL period 620, through the transmission path of the base station 110 having the PA as the transmission end.

According to an embodiment, to transmit the advance signal 640, the control unit 807 may be configured to identify the TA value configured to the terminal 120, to identify the specific duration for transmitting the advance signal 640 based on the TA value and to generate the advance signal 640.

According to an embodiment, the control unit 807 may be configured to identify the specific duration of the advance signal 640 based on at least one of the SCS of the UL signal and the SCS of the DL signal.

According to an embodiment, the control unit 807 may be configured to identify the specific duration of the advance signal 640 based on at least one of the element state or the thermal equilibrium state information of the PA, and the PA element state may further include at least one of the thermal expansion coefficient, the electrical conductivity, the specific resistance, or the specific heat of the PA.

According to an embodiment, the control unit 807 may be configured to identify the amplitude of the advance signal 640 based on at least one of the TA value and the element state of the PA, and the PA element state may further include at least one of the thermal expansion coefficient, the electrical conductivity, the specific resistance, or the specific heat of the PA.

According to an embodiment, the control unit 807 may be configured to modulate the advance signal 640 with the BPSK or the QPSK.

According to an embodiment, the control unit 807 may be configured such that the advance signal 640 includes the dummy signal for the channel occupancy of the shared spectrum.

According to an embodiment, to transmit the advance signal 640, the control unit 807 may be configured to stop the transmission of the advance signal 640, if the temperature change rate of the PA is smaller than the predefined threshold.

According to an embodiment, the control unit 807 may be further configured to, after receiving the UL signal, identify whether the PA element is in the thermal equilibrium state based on the temperature value of the element, to generate the advance signal 640 if the PA element is in the thermal equilibrium state, and to generate the advance signal 640 if the PA element is not in the thermal equilibrium state.

According to an embodiment, the control unit 807 may be further configured to identify the amplitude of the advance signal 640, based on the TA value configured to the terminal 120.

Figure 9:
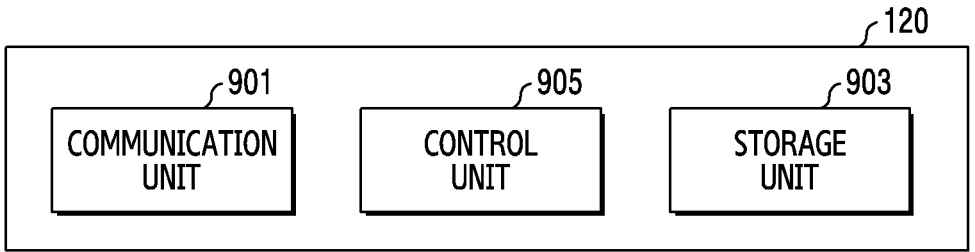
FIG. 9 illustrates a functional configuration of a terminal in a wireless communication system, according to embodiments.

The number and arrangement of components of the base station 110 shown in FIG. 9 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Alternatively or additionally, a set of (one or more) components shown in FIG. 8 may be integrated with each other, and/or may be implemented as an integrated circuit, as software, and/or a combination of circuits and software Although the base station 110 is described as the single entity in FIG. 8, the present disclosure is not limited thereto, as described above. The base station 110, according to various embodiments, may be implemented to build an access network having distributed deployment as well as integrated deployment (e.g., an eNB of LTE). As illustrated in FIGS. 1 through 6, the base station 110 may be divided into the CU and the DU, and the CU may be implemented to perform upper layers (e.g., packet data convergence protocol (PDCP)) and the DU may be implemented to perform lower layers (e.g., MAC, physical (PHY)).

As such, the base station 110 having the distributed deployment may further include a configuration for fronthaul interface communication. According to an embodiment, the base station 110, as the DU, may perform functions for transmitting and/or receiving a signal in a wired communication environment. The DU may include a wired interface, for controlling a direct connection between a device and a device via a transmission medium (e.g., copper wire, optical fiber). For example, the DU may transmit an electrical signal to another device through a copper wire, and/or may perform conversion between an electrical signal and an optical signal. The DU may be connected to the CU of the distributed deployment. However, this description is not construed to exclude a scenario in which the DU is connected to the CU over a wireless network. In addition, the DU may be additionally connected to the RU. However, this description is not construed as excluding a wireless environment including only the CU and the DU.

FIG. 9 illustrates a functional configuration of a terminal 120 in a wireless communication system, according to embodiments. A term such as '~unit' or '~er' used hereinafter may indicate a unit for processing at least one function or operation, and may be implemented using hardware, software, or a combination of hardware and software.

Referring to FIG. 9, the terminal 120 may include a communication unit 901, a storage unit 903, and a control unit 905.

The communication unit 901 may perform functions for transmitting and/or receiving a signal over a radio channel. For example, the communication unit 901 may perform a conversion function between a baseband signal and a bit stream according to a physical layer standard of the system. As another example, in data transmission, the communication unit 901 may generate complex symbols by encoding and modulating a transmit bit stream. Additionally, in data reception, the communication unit 901 may restore a received bit stream by demodulating and decoding a baseband signal. The communication unit 901 may up-convert the baseband signal into an RF band signal, may transmit the signal via an antenna, and may down-convert an RF band signal received via the antenna into a baseband signal. For example, the communication unit 901 may include a transmit filter, a receive filter, an amplifier, a mixer, an oscillator, a DAC, an ADC, and the like.

The communication unit 901 may include a plurality of transmit and receive paths. Further, the communication unit 901 may include an antenna unit. The communication unit 901 may include at least one antenna array including a plurality of antenna elements. In view of the hardware, the communication unit 901 may include a digital circuit and an analog circuit (e.g., an RFIC). Herein, the digital circuit and the analog circuit may be implemented as a single package. The communication unit 901 may further include a plurality of RF chains. The communication unit 901 may perform beamforming. For example, the communication unit 901 may apply a beamforming weight to a signal, to give directivity to the signal to transmit and/or receive, according to the configuration of the control unit 905.

The communication unit 901 may transmit and/or receive a signal. As such, the communication unit 901 may include at least one transceiver. The communication unit 901 may receive a DL signal. The DL signal may include, but not be limited to, a synchronization signal (SS), a reference signal (RS) (e.g., a cell-specific reference signal (CRS)), a demodulation (DM)-RS, system information (e.g., a master information block (MIB), a system information block (SIB), remaining system information (RMSI), other system information (OSI)), a configuration message, control information, and/or DL data. Also, the communication unit 901 may transmit a UL signal. The UL signal may include, but not be limited to, an uplink control information (UCI), a random access related signal (e.g., a random access preamble (RAP) (or Msg1), Msg3), a reference signal (e.g., an SRS, a DMRS), or a buffer status report (BSR). For example, the UCI may include, but not be limited to, at least one of a scheduling request (SR), acknowledgement (ACK)/negative ACK (NACK) information of a hybrid acknowledge (HARQ) procedure, channel state information (CSI), and the like. According to an embodiment, the communication unit 901 may receive UL DMRS allocation information. According to an embodiment, the communication unit 901 may transmit a UL DMRS symbol.

For example, the communication unit 901 may include an RF processing unit and a baseband processing unit. The RF processing unit may perform a function for transmitting and/or receiving a signal over the radio channel, such as, but not be limited to, band conversion and amplification of the signal. The RF processing unit may up-convert a baseband signal provided from the baseband processing unit into an RF band signal, may transmit the signal via the antenna, and may down-convert an RF band signal received via the antenna into a baseband signal. For example, the RF processing unit may include a transmit filter, a receive filter, an amplifier, a mixer, an oscillator, a DAC, an ADC, and the like. The terminal 120 may include one or more antennas. The RF processing unit may include a plurality of RF chains. Further, the RF processing unit may perform the beamforming. For the beamforming, the RF processing unit may adjust the phase and the amplitude of signals transmitted and received via a plurality of antennas or antenna elements.

The baseband processing unit may perform the conversion function between a baseband signal and a bit stream according to the physical layer standard of the system. For example, in data transmission, the baseband processing unit may generate complex symbols by encoding and modulating a transmit bit stream. In addition, in data reception, the baseband processing unit may demodulate and/or decode the baseband signal provided from the RF processing unit to restore the received bit stream. For example, conforming to the OFDM scheme, in the data transmission, the baseband processing unit may generate complex symbols by encoding and/or modulating a transmit bit stream, may map the complex symbols to subcarriers, and may generate OFDM symbols through inverse fast Fourier transform (IFFT) operation and cyclic prefix (CP) insertion. In addition, in the data reception, the baseband processing unit may divide a baseband signal provided from the RF processing unit into OFDM symbols, may restore signals mapped to subcarriers through a fast Fourier transform (FFT) operation, and may restore the received bit stream through demodulation and decoding.

The communication unit 901 may transmit and/or receive signals as described above. Accordingly, all or a part of the communication unit 901 may be referred to as a transmitter, a receiver, or a transceiver. The communication unit 901 may include a plurality of communication modules to support a plurality of different radio access technologies. Additionally, the communication unit 901 may include different communication modules to process signals of different frequency bands. For example, the different radio access technologies may include, but not be limited to, a wireless local area network (LAN) (e.g., IEEE 902.1x), a cellular network (e.g., LTE, NR), and the like. In addition, the different frequency bands may include a super high frequency (SHF) (e.g., 2.5 GHZ, 5 GHZ) band and a millimeter wave (e.g., 60 GHZ) band. In addition, the communication unit 2401 may use the same radio access technology on different frequency bands (e.g., an unlicensed spectrum for licensed assisted access (LAA) or NR-unlicensed (U), citizens broadband radio service (CBRS) (e.g., 3.5 GHZ)).

The storage unit 903 may store data such as, but not be limited to, basic programs for operation of the terminal 120, application programs, and/or configuration information. The storage unit 903 may include a volatile memory, a nonvolatile memory, and/or a combination of a volatile memory and a non-volatile memory. The storage unit 903 may provide the stored data at a request of the control unit 905.

The control unit 905 may control general operations of the terminal 120. For example, the control unit 905 may transmit and/or receive signals through the communication unit 901. In addition, the control unit 905 may write and/or may read data to and/or from the storage unit 903. The control unit 905 may perform protocol stack functions required by a communication standard. As such, the control unit 905 may include at least one processor. The control unit 905 may include at least one processor or microprocessor, and/or may be a part of the processor. In addition, a part of the communication unit 901 and/or the control unit 905 may be referred to as a communication processor (CP). The control unit 905 may include various modules for performing the communication. According to various embodiments, the control unit 905 may control the terminal 120 to perform operations described according to various embodiments.

The control unit 905 may include a communication processor (CP) for controlling the communication and an application processor (AP) for controlling an upper layer of a communication stack such as an application program. According to various embodiments, the control unit 905 may be configured to perform a dynamic spectrum sharing function. According to an embodiment, the control unit 905 may be configured to allow the terminal 120 to dynamically use an LTE cell and an NR cell in an E-UTRA NR (EN)-DC environment. In addition, according to an embodiment, the control unit 905 may be configured to allow the terminal 120 to dynamically use cells by two nodes in a multi-radio access technology (RAT) (MR)-DC environment, as well as, the EN-DC environment. In addition, the control unit 905 may control the terminal 120 to perform operations according to various embodiments described above. According to an embodiment, the control unit 905 may identify UL DMRS allocation information received from the base station 110. According to an embodiment, the control unit 905 may identify the number of UL DMRS symbols. According to an embodiment, the control unit 905 may identify an interval between UL DMRS symbols. According to an embodiment, the control unit 905 may identify positions of UL DMRS symbols within a slot.

According to an embodiment, a method performed by a base station 110 in a wireless communication system may include receiving an uplink signal from a terminal 120 configured with TA in an uplink period 310 according to a TDD configuration, transmitting an advance signal for a specific duration between an end point 310 of receiving the uplink signal and a start point of a downlink period 320 of the TDD configuration, through a transmission path of the base station 110 having a power amplifier as a transmission end, and transmitting a downlink signal to the terminal 120 in the downlink period 320.

According to an embodiment, the transmitting of the advance signal may include identifying a TA value configured to the terminal 120, identifying a specific duration for transmitting the advance signal based on the TA value and generating the advance signal.

According to an embodiment, the specific duration of the advance signal may be identified based on at least one of a sub-carrier spacing (SCS) of the uplink signal or an SCS of the downlink signal.

According to an embodiment, the specific duration of the advance signal may be identified based on at least one of an element state or thermal equilibrium state information of the power amplifier, and the element state of the power amplifier may further include at least one of a thermal expansion coefficient, electrical conductivity, specific resistance, or specific heat of the power amplifier.

According to an embodiment, an amplitude of the advance signal may be identified based on at least one of the TA value or an element state of the power amplifier, and the element state of the power amplifier may further include at least one of a thermal expansion coefficient, electrical conductivity, specific resistance, or specific heat of the power amplifier.

According to an embodiment, the advance signal may be modulated with BPSK or QPSK.

According to an embodiment, the advance signal may include a dummy signal for channel occupancy of a shared spectrum.

According to an embodiment, the transmitting of the advance signal may include stopping transmission of the advance signal, if a temperature change rate of the power amplifier is smaller than a predefined threshold.

According to an embodiment, the method performed by the base station 110 in the wireless communication system may further include, after receiving the uplink signal 310, identifying whether the power amplifier element is in a thermal equilibrium state based on a temperature value of the element, if the power amplifier element is in the thermal equilibrium state, generating no advance signal, and if the power amplifier element is not in the thermal equilibrium state, generating the advance signal.

According to an embodiment, the method performed by the base station 110 in the wireless communication system may further include identifying an amplitude of the advance signal, based on the TA value configured to the terminal 120.

According to an embodiment, an apparatus of a base station 110 in a wireless communication system may include a processor configured to receive an uplink signal from a terminal 120 configured with TA in an uplink period according to a TDD configuration, transmit an advance signal for a specific duration between an end point 310 of receiving the uplink signal and a start point of a downlink period 320 of the TDD configuration, through a transmission path of the base station 110 having a power amplifier as a transmission end, and transmit a downlink signal to the terminal 120 in the downlink period 320.

According to an embodiment, the apparatus of the base station 110 may include the processor configured to, transmit the advance signal, identify a TA value configured to the terminal 120, identify a specific duration for transmitting the advance signal based on the TA value, and generate the advance signal.

According to an embodiment, the apparatus of the base station 110 may be configured to identify the specific duration of the advance signal based on at least one of an SCS of the uplink signal or an SCS of the downlink signal.

According to an embodiment, the apparatus of the base station 110 may be configured to identify the specific duration of the advance signal based on at least one of an element state or thermal equilibrium state information of the power amplifier, and the element state of the power amplifier may further include at least one of a thermal expansion coefficient, electrical conductivity, specific resistance, or specific heat of the power amplifier.

According to an embodiment, the apparatus of the base station 110 may be configured to identify an amplitude of the advance signal based on at least one of the TA value or the element state of the power amplifier, and the element state of the power amplifier may further include at least one of a thermal expansion coefficient, electrical conductivity, specific resistance, or specific heat of the power amplifier.

According to an embodiment, the apparatus of the base station 110 may be configured to modulate the advance signal with BPSK or QPSK.

According to an embodiment, the apparatus of the base station 110 may be configured to include a dummy signal for channel occupancy of a shared spectrum in the advance signal.

According to an embodiment, the apparatus of the base station 110 may include the processor configured to, transmit the advance signal, stopping transmission of the advance signal, if a temperature change rate of the power amplifier is smaller than a predefined threshold.

According to an embodiment, the apparatus of the base station 110 in the wireless communication system may include the processor configured to, after receiving the uplink signal 310, identify whether the power amplifier element is in a thermal equilibrium state based on a temperature value of the element, if the power amplifier element is in the thermal equilibrium state, generate no advance signal, and if the power amplifier element is not in the thermal equilibrium state, generate the advance signal.

According to an embodiment, the apparatus of the base station 110 in the wireless communication system may include the processor configured to identify an amplitude of the advance signal, based on the TA value configured to the terminal 120.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (e.g., a software module, software) may be stored to a random access memory, a non-volatile memory including a flash memory, a read only memory (ROM), an electrically erasable programmable ROM (EE-PROM), a magnetic disc storage device, a compact disc (CD)-ROM, digital versatile discs (DVDs) or other optical storage devices, and a magnetic cassette. Alternatively, the program may be stored to a memory combining part or all of those recording media. In addition, a plurality of memories may be included.

The program may be stored in an attachable storage device accessible via a communication network such as Internet, Intranet, LAN, wide LAN (WLAN), or storage area network (SAN), or a communication network by combining these networks. Such a storage device may access a device which executes an embodiment through an external port. In addition, a separate storage device on the communication network may access the device which executes an embodiment.

In the embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the embodiments have been described in the explanations of the present disclosure, it should be noted that various changes may be made therein without departing from the scope of the present disclosure. Therefore, the scope of the present disclosure may not be limited and/or defined by the described embodiments and may be defined not only by the scope of the claims as below but also their equivalents.

What is claimed is:

1. A method performed by a base station in a wireless communication system, the method comprising:

receiving, from a user equipment (UE) configured with timing advance (TA) value, an uplink signal in an uplink period, according to a time division duplex (TDD) configuration;

transmitting, through a transmission path of the base station, an advance signal for a predetermined duration between an end point of receiving the uplink signal and a start point of a downlink period of the TDD configuration, the transmission path of the base station having a power amplifier as a transmission end; and transmitting, to the UE, a downlink signal in the downlink period.

2. The method of claim 1, wherein the transmitting the advance signal comprises:

identifying the TA value configured to the UE;

identifying, based on the TA value, the predetermined duration for transmitting the advance signal; and generating the advance signal.

3. The method of claim 1, wherein the predetermined duration of the advance signal is identified based on at least one of a first sub-carrier spacing (SCS) of the uplink signal or a second SCS of the downlink signal.

4. The method of claim 1, wherein the predetermined duration of the advance signal is identified based on at least one of an element state or thermal equilibrium state information of the power amplifier, and wherein the element state of the power amplifier comprises at least one of a thermal expansion coefficient, an electrical conductivity, a specific resistance, or a specific heat of the power amplifier.

5. The method of claim 1, wherein an amplitude of the advance signal is identified based on at least one of a TA value or an element state of the power amplifier, and wherein the element state of the power amplifier comprises at least one of a thermal expansion coefficient, an electrical conductivity, a specific resistance, or a specific heat of the power amplifier.

6. The method of claim 1, wherein the advance signal is modulated with at least one of a binary phase shift keying (BPSK) or quadrature phase shift keying (QPSK).

7. The method of claim 1, wherein the advance signal comprises a dummy signal for channel occupancy of a shared spectrum.

8. The method of claim 1, wherein the transmitting the advance signal comprises:

based on a temperature change rate of the power amplifier being smaller than a predefined threshold, stopping transmission of the advance signal.

9. The method of claim 1, further comprising:

identifying, after the receiving of the uplink signal, whether the power amplifier is in a thermal equilibrium state based on a temperature value of an element state of the power amplifier;

based on the power amplifier being in the thermal equilibrium state, preventing generating the advance signal; and based on the power amplifier not being in the thermal equilibrium state, generating the advance signal.

10. The method of claim 1, further comprising:

identifying an amplitude of the advance signal, based on the TA value configured to the UE.

11. A base station in a wireless communication system, the base station comprising:

at least one transceiver;

at least one memory storing instructions; and at least one processor operatively connected to the at least one transceiver, and the at least one memory, wherein the at least one processor is configured to execute the instructions to:

receive, from a user equipment (UE) configured with timing advance (TA) value, an uplink signal in an uplink period, according to a time division duplex (TDD) configuration;

transmit, through a transmission path of the base station, an advance signal for a predetermined duration between an end point of receiving the uplink signal and a start point of a downlink period of the TDD configuration, the transmission path of the base station having a power amplifier as a transmission end; and transmit, to the UE, a downlink signal in the downlink period.

12. The base station of claim 11, wherein the at least one processor is further configured to execute the instructions to:

identify the TA value configured to the UE;

identify, based on the TA value, the predetermined duration for transmitting the advance signal; and generate the advance signal.

13. The base station of claim 11, wherein the predetermined duration of the advance signal is identified based on at least one of a first sub-carrier spacing (SCS) of the uplink signal or a second SCS of the downlink signal.

14. The base station of claim 11, wherein the predetermined duration of the advance signal is identified based on at least one of an element state or thermal equilibrium state information of the power amplifier, and wherein the element state of the power amplifier comprises at least one of a thermal expansion coefficient, an electrical conductivity, a specific resistance, or a specific heat of the power amplifier.

15. The base station of claim 11, wherein an amplitude of the advance signal is identified based on at least one of a TA value or an element state of the power amplifier, and wherein the element state of the power amplifier comprises at least one of a thermal expansion coefficient, an electrical conductivity, a specific resistance, or a specific heat of the power amplifier.

16. The base station of claim 11, wherein the advance signal is modulated with at least one of a binary phase shift keying (BPSK) or quadrature phase shift keying (QPSK).

17. The base station of claim 11, wherein the advance signal comprises a dummy signal for channel occupancy of a shared spectrum.

18. The base station of claim 11, wherein the at least one processor is further configured to execute the instructions to:

based on a temperature change rate of the power amplifier being smaller than a predefined threshold, stop transmission of the advance signal.

19. The base station of claim 11, wherein the at least one processor is further configured to execute the instructions to:

identify, after receipt of the uplink signal, whether the power amplifier is in a thermal equilibrium state based on a temperature value of an element state of the power amplifier;

based on the power amplifier being in the thermal equilibrium state, prevent generation of the advance signal; and based on the power amplifier not being in the thermal equilibrium state, generate the advance signal.

20. The base station of claim 11, wherein the at least one processor is further configured to execute the instructions to:

identify an amplitude of the advance signal, based on the TA value configured to the UE.

* * * * *